United States Patent
Kludy et al.

(10) Patent No.: US 9,838,249 B2
(45) Date of Patent: *Dec. 5, 2017

(54) MAINTAINING RESOURCE AVAILABILITY DURING MAINTENANCE OPERATIONS

(71) Applicant: Citrix Systems, Inc., Fort Lauderdale, FL (US)

(72) Inventors: Thomas M. Kludy, Cooper City, FL (US); Ashish Gujarathi, Parkland, FL (US); Felipe Leon, Fort Lauderdale, FL (US); Juliano Maldaner, Cupertino, CA (US); Andrew Ogle, Amersham (GB); Ricardo Fernando Feijoo, Davie, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/286,835

(22) Filed: Oct. 6, 2016

(65) Prior Publication Data

US 2017/0024225 A1 Jan. 26, 2017

Related U.S. Application Data

(63) Continuation of application No. 14/051,664, filed on Oct. 11, 2013, now Pat. No. 9,471,331.

(Continued)

(51) Int. Cl.
*G06F 1/32* (2006.01)
*G06F 9/44* (2006.01)
(Continued)

(52) U.S. Cl.
CPC ............ *H04L 41/08* (2013.01); *G06F 9/4405* (2013.01); *G06F 9/4416* (2013.01);
(Continued)

(58) Field of Classification Search
CPC .. G06F 9/4416; G06F 15/177; G06F 11/0793; G06F 9/4405; H04L 41/08
See application file for complete search history.

(56) References Cited

U.S. PATENT DOCUMENTS

| 6,915,347 B2 | 7/2005 | Hanko et al. |
| 8,141,075 B1 | 3/2012 | Chawla et al. |

(Continued)

FOREIGN PATENT DOCUMENTS

| CN | 101227325 A | 7/2008 |
| CN | 102202049 A | 9/2011 |

OTHER PUBLICATIONS

Mar. 20, 2017—(CN) First Office Action—App 201380063115.9, Eng Tran.

(Continued)

*Primary Examiner* — Stefan Stoynov
(74) *Attorney, Agent, or Firm* — Banner & Witcoff, Ltd.

(57) ABSTRACT

One or more aspects of this disclosure may relate to using a configurable server farm preference for an application, desktop or other hosted resource. Additional aspects may relate to moving server farm workloads based on the configurable server farm preference. Further aspects may relate to performing reboot cycles, a reboot schedule and on-demand rebooting. Yet further aspects may relate to staggering individual machine reboot operations over a specified period of time and performing reboot operations such that some machines are available for user sessions during a reboot cycle.

20 Claims, 12 Drawing Sheets

Related U.S. Application Data

(60) Provisional application No. 61/713,034, filed on Oct. 12, 2012.

(51) Int. Cl.
   *G06F 9/50* (2006.01)
   *G06F 9/45* (2006.01)
   *G06F 11/07* (2006.01)
   *H04L 12/24* (2006.01)
   *H04L 29/08* (2006.01)
   *G06F 9/455* (2006.01)
   *H04L 29/06* (2006.01)

(52) U.S. Cl.
   CPC .......... *G06F 9/45558* (2013.01); *G06F 9/505* (2013.01); *G06F 9/5083* (2013.01); *G06F 11/0706* (2013.01); *G06F 11/0793* (2013.01); *H04L 41/0816* (2013.01); *H04L 67/10* (2013.01); *H04L 67/1023* (2013.01); *H04L 67/34* (2013.01); *H04L 67/42* (2013.01); *G06F 2009/45595* (2013.01)

(56) References Cited

U.S. PATENT DOCUMENTS

| | | | |
|---|---|---|---|
| 8,296,756 | B1 | 10/2012 | Feeser et al. |
| 8,381,218 | B2 | 2/2013 | Periorellis et al. |
| 8,539,565 | B2 | 9/2013 | Beletski et al. |
| 8,555,274 | B1 | 10/2013 | Chawla et al. |
| 2004/0003082 | A1 | 1/2004 | Abbondanzio et al. |
| 2004/0255110 | A1 | 12/2004 | Zimmer et al. |
| 2005/0091653 | A1 | 4/2005 | Willehadson et al. |
| 2006/0075001 | A1 | 4/2006 | Canning et al. |
| 2008/0172553 | A1 | 7/2008 | Childress et al. |

OTHER PUBLICATIONS

International Search Report and Written Opinion dated Mar. 25, 2014 in International Application No. PCT/US2013/064513.

May 1, 2017—(US) Ex Parte Quayle—U.S. Appl. No. 15/286,731.

Pending Operations

| | Reset | Launch | Admin | Untaint | Policy | Idle Pool | Schedule |
|---|---|---|---|---|---|---|---|
| Reset | Ignore | Overwrite | Overwrite | Overwrite | Overwrite | Overwrite | Overwrite |
| Launch | Queue | Ignore | Overwrite | Overwrite | Overwrite | Overwrite | Overwrite |
| Admin | Queue | Queue | Overwrite | Queue | Overwrite | Overwrite | Overwrite |
| Untaint | Queue | Queue | Queue | Ignore | Overwrite | Overwrite | Overwrite |
| Policy | Ignore | Ignore | Ignore | Ignore | Ignore | Overwrite | Overwrite |
| Idle Pool | Ignore | Ignore | Ignore | Ignore | Ignore | Ignore | Overwrite |
| Schedule | Ignore | Queue | Queue | Ignore | Ignore | Ignore | Ignore |

Reboot Cycle Operations

MAINTAINING RESOURCE AVAILABILITY DURING MAINTENANCE OPERATIONS

CROSS-REFERENCE TO RELATED APPLICATIONS

This application is a continuation of U.S. application Ser. No. 14/051,664, filed Oct. 11, 2013 (now U.S. Pat. No. 9,471,331 B2, issued Oct. 18, 2016), and entitled "MAINTAINING RESOURCE AVAILABILITY DURING MAINTENANCE OPERATIONS," which claims priority to U.S. Provisional Patent Application Ser. No. 61/713,034, filed Oct. 12, 2012, and entitled "SEAMLESS TRANSITION OF USERS."

Each of the above-mentioned patent applications is incorporated by reference herein in its entirety.

BACKGROUND

Aspects of the disclosure relate to computer hardware and software.

To deliver hosted applications, desktops and other resources to users, a provider will often deploy many servers or machines that host and provide the resources to the users. These servers may be divided among one or more server farms or sites. When seeking access to a hosted resource, a user may connect to a server farm or a machine using, for example, a user device, such as a personal computer, laptop or mobile device.

While the machines or server farms are deployed, it may be desirable to perform various maintenance operations. A few examples of when a maintenance operation may be needed include when a database has become corrupt; when one or more of the machines have been selected for upgrade or replacement; when one or more of the machines are to be rebooted; and when a server farm's workload is to be transferred to a different workload. Performing a maintenance operation, however, can cause adverse effects such as a connection or service outage. For example, to perform a maintenance operation a server farm or machine may need to be disconnected or otherwise disabled. Any user attempting to access one of the resources hosted by the affected server farms or machines may, as a result of the connection or service outage, be unable to access the desired hosted resource. Providers may wish to avoid or minimize the impact of a maintenance operation on a user's ability to access a hosted application, desktop or other resource.

SUMMARY

One or more aspects of this disclosure may relate to using a configurable server farm preference for an application, desktop or other hosted resource.

For example, in accordance with various aspects, a server farm preference may be configured for a hosted resource. The server farm preference may include an indication of a primary server farm and an indication of one or more secondary server farms. A request for the hosted resource may be received. Based on the request, it may be determined whether the hosted resource is configured with a server farm preference; responsive to determining that the hosted resource is configured with the server farm preference, it may be determined whether the one or more secondary server farms has an active or disconnected session for the user; and responsive to determining that the one or more secondary server farms has the active or disconnected session for the user, one or more secondary server farms may be selected to host the hosted resource.

Various aspects of this disclosure may relate to moving server farm workloads based on the configurable server farm preference.

For example, in accordance with some aspects, a workload that is to be moved from a server farm may be determined; a target server farm may be selected; and a new workload in the target server farm may be created. When the new workload is available to accept requests for hosted resources, one or more resources within the new workload may be published; for each of the one or more resources, a corresponding server farm preference may be configured; the workload may be monitored to decommission any machines in the workload that have no active or disconnected session and to delete the workload upon determining that all machines in the workload have been decommissioned; and for each of the one or more resources, the server farm may be removed from the corresponding server farm preference.

Additional aspects of this disclosure relate towards methods for performing reboot cycles, a reboot schedule and on-demand rebooting.

For example, in accordance with some aspects related to reboot cycles, a reboot cycle for performing automated machine reboots may be initiated; a set of eligible machines for the reboot cycle may be determined; an interval between each machine reboot may be determined; and based on the interval, machine-specific processing for the reboot cycle may be performed. Such machine-specific processing may include an attempt to reboot each machine in the set of eligible machines.

As another example, in accordance with some aspects related to reboot schedules, a configured reboot schedule may be processed that includes a desktop group that is to be rebooted; it may be determined whether to initiate a reboot cycle in accordance with the configured reboot schedule; responsive to determining to initiate the reboot cycle, it may be determined whether another reboot schedule-initiated reboot cycle is active or disconnected for the desktop group; responsive to determining that there is not another reboot schedule-initiated reboot cycle that is active or disconnected for the desktop group, the reboot cycle may be initiated.

As yet another example, in accordance with some aspects related to catalog reboots, a catalog reboot configuration data may be received; a set of catalog machines may be determined; the set of catalog machines into one or more groups according to desktop group may be determined; and for each of the one or more groups, a corresponding reboot cycle may be initiated, resulting in a plurality of reboot cycles being initiated.

As another example, in accordance with some aspects, individual machine reboot operations can be staggered and reboot operations may be performed such that some machines are available for user session during a reboot cycle.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 10 illustrates an example priority interaction between power operations issued by a reboot cycle and pending operations from other sources according to various aspects described herein.

FIG. 12 illustrates an example screenshot from a user interface that can be used to guide a user as he or she creates a reboot schedule or catalog reboot.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
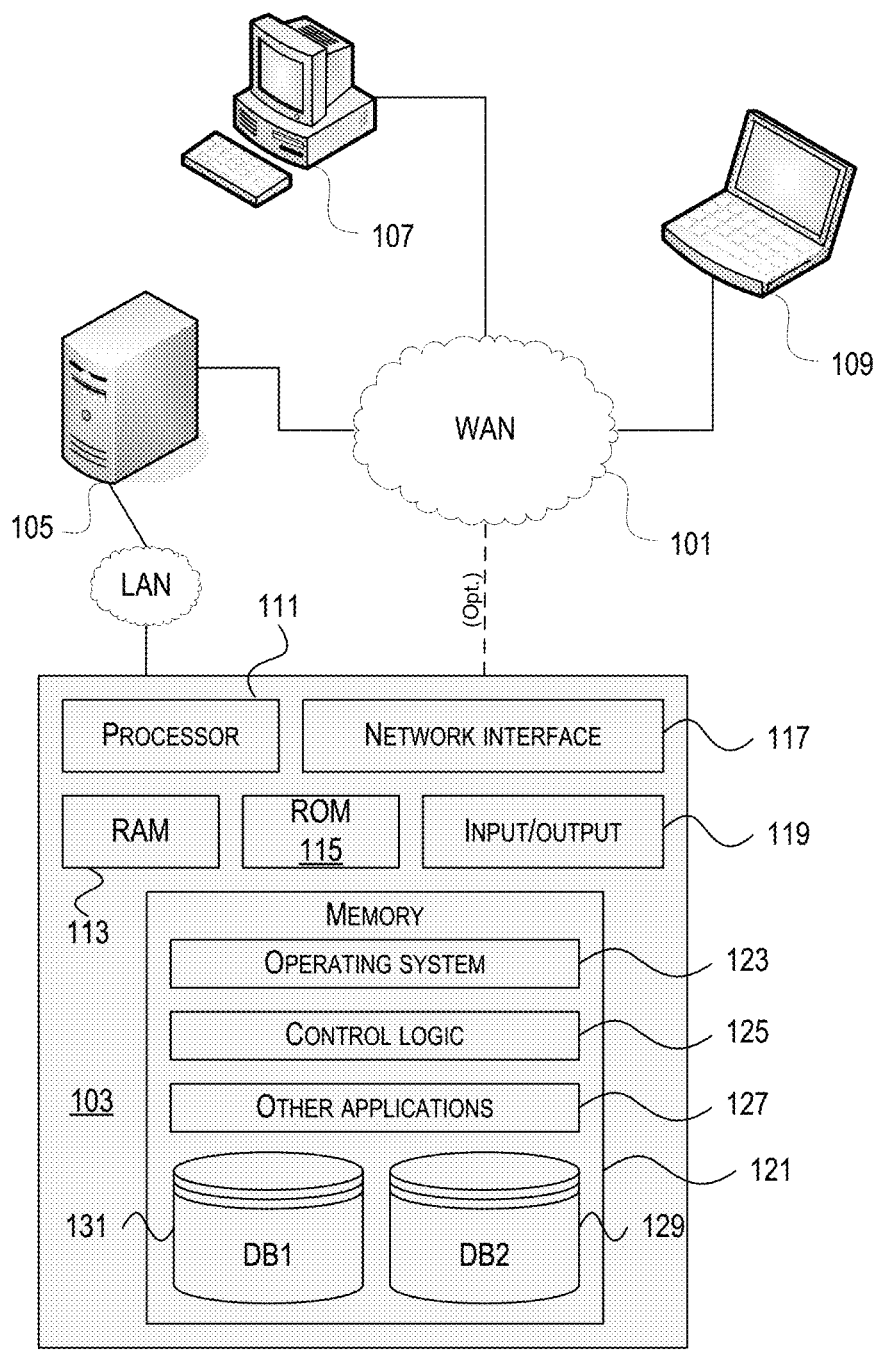
FIG. 1 depicts an illustrative computer system architecture that may be used in accordance with one or more aspects of the disclosure.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
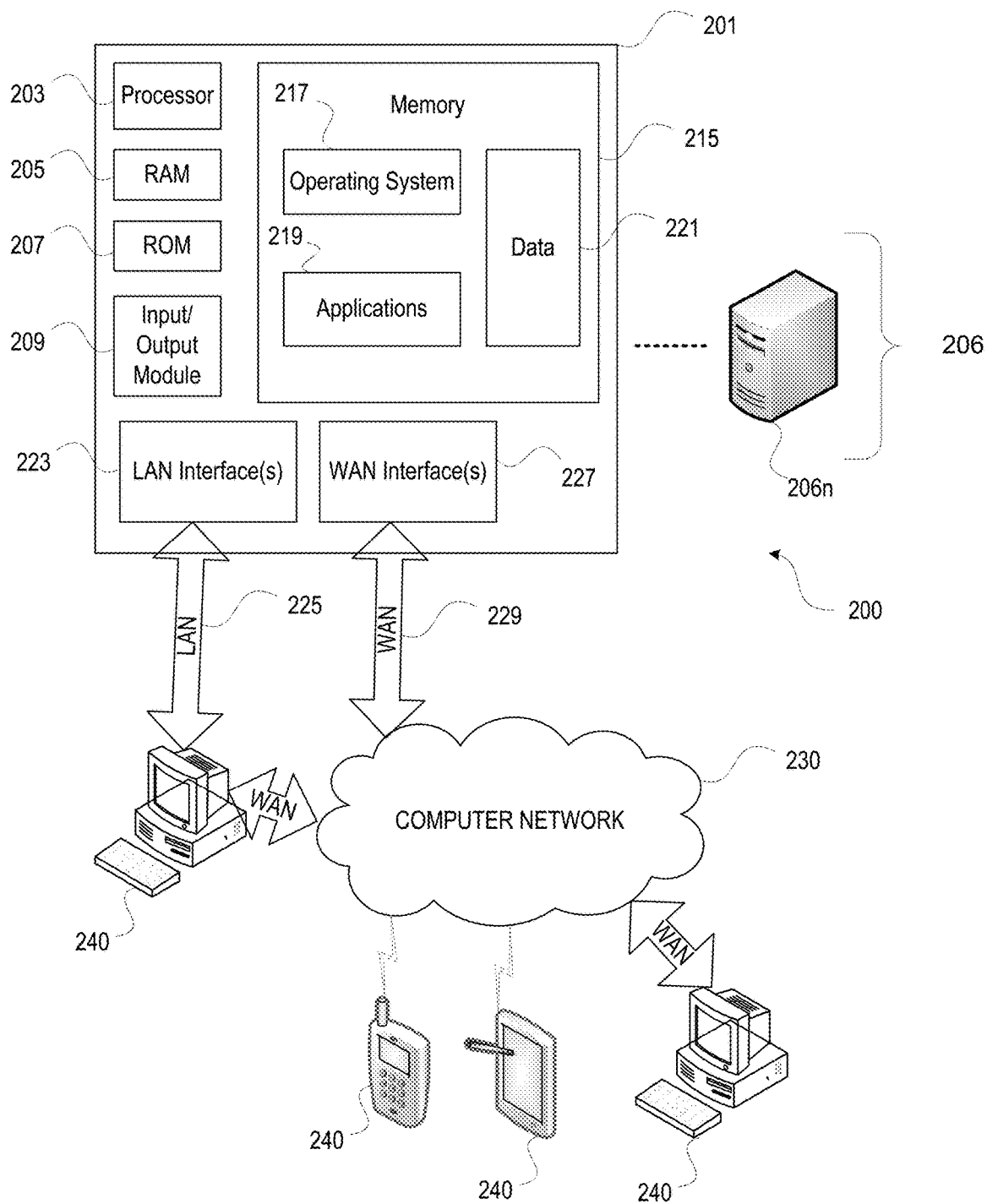
FIG. 2 depicts an illustrative remote-access system architecture that may be used in accordance with various aspects of the disclosure.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: user device(s); client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, an application store server (e.g., Citrix StoreFront) a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
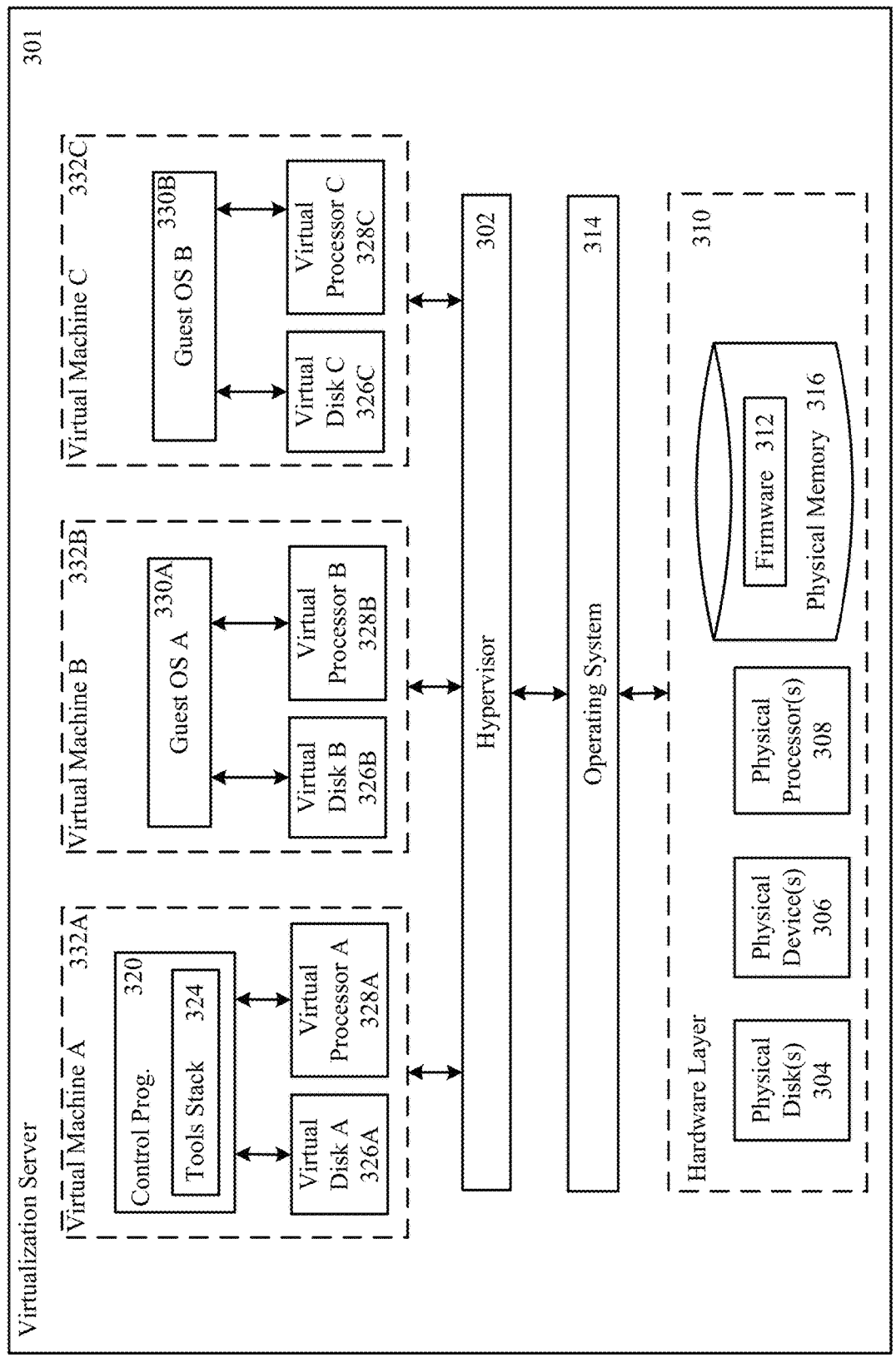
FIG. 3 depicts an illustrative virtualized (hypervisor) system architecture that may be used in accordance one or more aspects of the disclosure.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
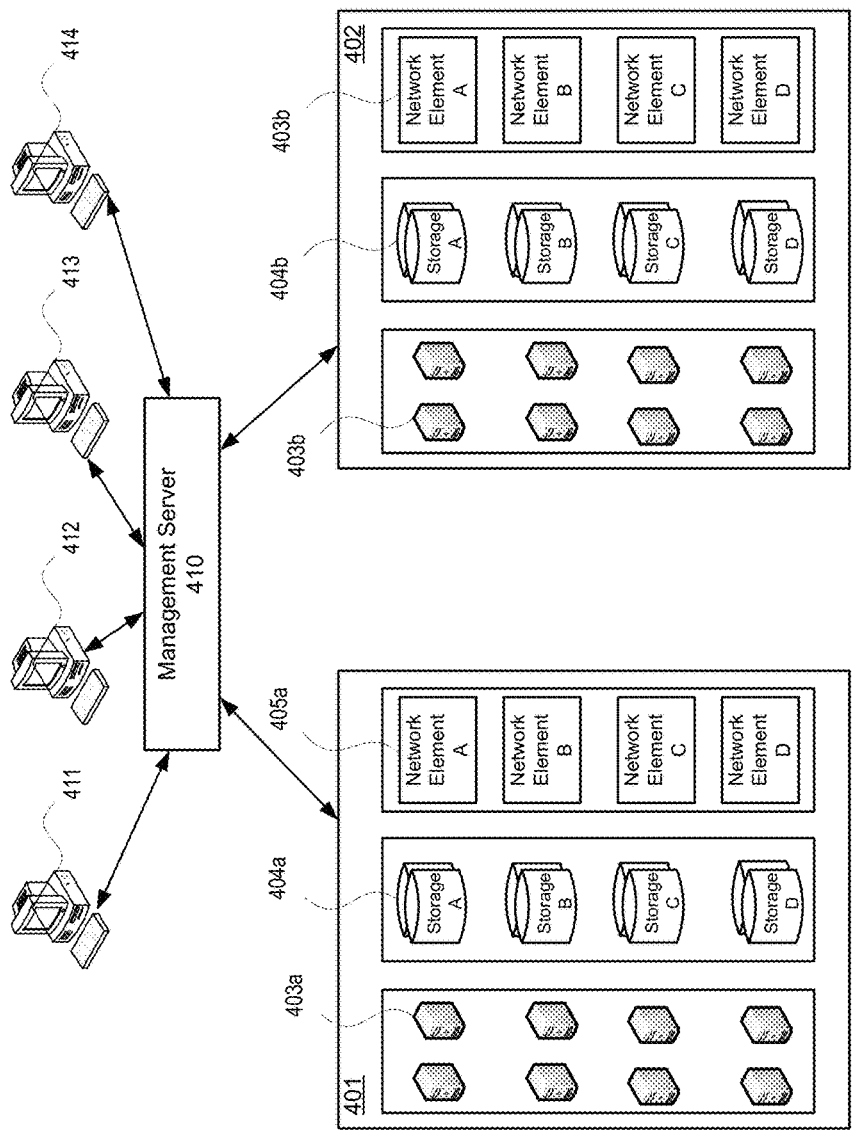
FIG. 4 depicts an illustrative cloud-based system architecture that may be used in accordance various aspects of the disclosure.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Illustrative Embodiment(s)

In order to deliver hosted applications, desktops or other resources to end users, an organization or service provider (e.g., an information technology (IT) provider or cloud service provider (CSP)) may deploy many machines to host user sessions. The machines may be divided among many server farms or sites in order to handle an arbitrarily large number of machines and users, or in order to provide additional levels of isolation to the users. In addition, each machine may have a different version of software or operating system installed.

It is noted that the general term "machine" can refer to a virtual machine or a physical machine.

Once the farms have been deployed and are hosting sessions, it may be necessary to perform a maintenance operation. However, it may be difficult to perform a maintenance operation without impacting user connectivity such as by causing a connection or service outage. While many examples of maintenance operations will be discussed throughout this disclosure, a few examples of when a maintenance operation may be needed include when a database has become corrupt; when one or more of the machines have been selected for upgrade or replacement; when a device or machine is to be rebooted; and when a server farm's workload is to be transferred to a different workload.

As a more particular example, a workload (e.g., a group, or groups, of machines within a server farm that hosts specific applications and desktops, and, in some embodiments, perform load balancing between themselves) may need to be moved to other farms, without revoking access to the entire farm, and without disruption of user connections to the applications and desktops hosted on the workload. An example of when this would happen is if the server farm has already reached its maximum capacity for users and machines, but the workload must be expanded to handle increasing user needs. In this case, an administrator may choose to move one or more workloads from the heavily-loaded farm and to a lightly-loaded or new farm. Such a move may require an outage of at least minimal length. In large scale deployments, such as cloud and enterprise, performing machine updates can cause highly disruptive service outages if all machines that implement a workload are disconnected or disabled (e.g., by being set to a maintenance mode). Furthermore, when machines span multiple domains, sites or networks, a manual process may need to be initiated for each scope.

Other situations may also require an outage of at least minimal length including, for example, when moving users from one server to another, when changing from one application version to another, etc.

One existing solution for performing maintenance operations includes the scheduling of an outage time period that requires terminating sessions (e.g., existing and/or disconnected sessions are terminated/decommissioned) and preventing any new sessions from being created. This may potentially result in data loss by end users and there is a time period where new sessions cannot be launched by end users, resulting in a service outage.

Another existing solution is to, for example, add new machines first and then disconnect or otherwise disable the old machines. Old machines can be decommissioned only after new machines are successfully added and ready to provide the resources to the users. This method, however, is that extra capacity is required to perform such maintenance operations, such as an update on existing workloads. Also, because new machines are allocated and old machines de-allocated, this method results in more activity in an active directory because the machines must reside in specific organization units (OUs). In-place updates are not supported in this method, and in-place updates are desirable and necessary to support statically allocated machines that cannot be replaced once the user connects the first time.

One other existing solution for performing maintenance operations includes the scheduling of machine reboots to, for example, handle misbehaving applications, fix system operations that fail to cleanup as users login and logoff, or as part of a normal maintenance routine (e.g., after an image update). This may potentially result in a boot storm that overloads the underlying infrastructure and affect a user's ability to connect to the hosted resources.

The example embodiments discussed throughout this disclosure provide additional or alternative solutions for performing maintenance operations include features to lessen or minimize connection or service outages, features to allow for in-place updates, and to lessen or minimize the potential of a boot storm.

Workloads can host various resources. For example, a workload may host resources for different users, be dedicated to hosting resources of a particular resource (or resource version). In some embodiments, resources such as the applications and desktops do not span across multiple workloads. For example, even if two users install or subscribe to the same application, but each user's application is on a different workload, two published applications with identical properties may be created (e.g., one for each workload, one for each user). Various aspects related to the types of resources can be included in a workload or how a workload can be configured will be discussed throughout the examples described herein.

Figure 5:
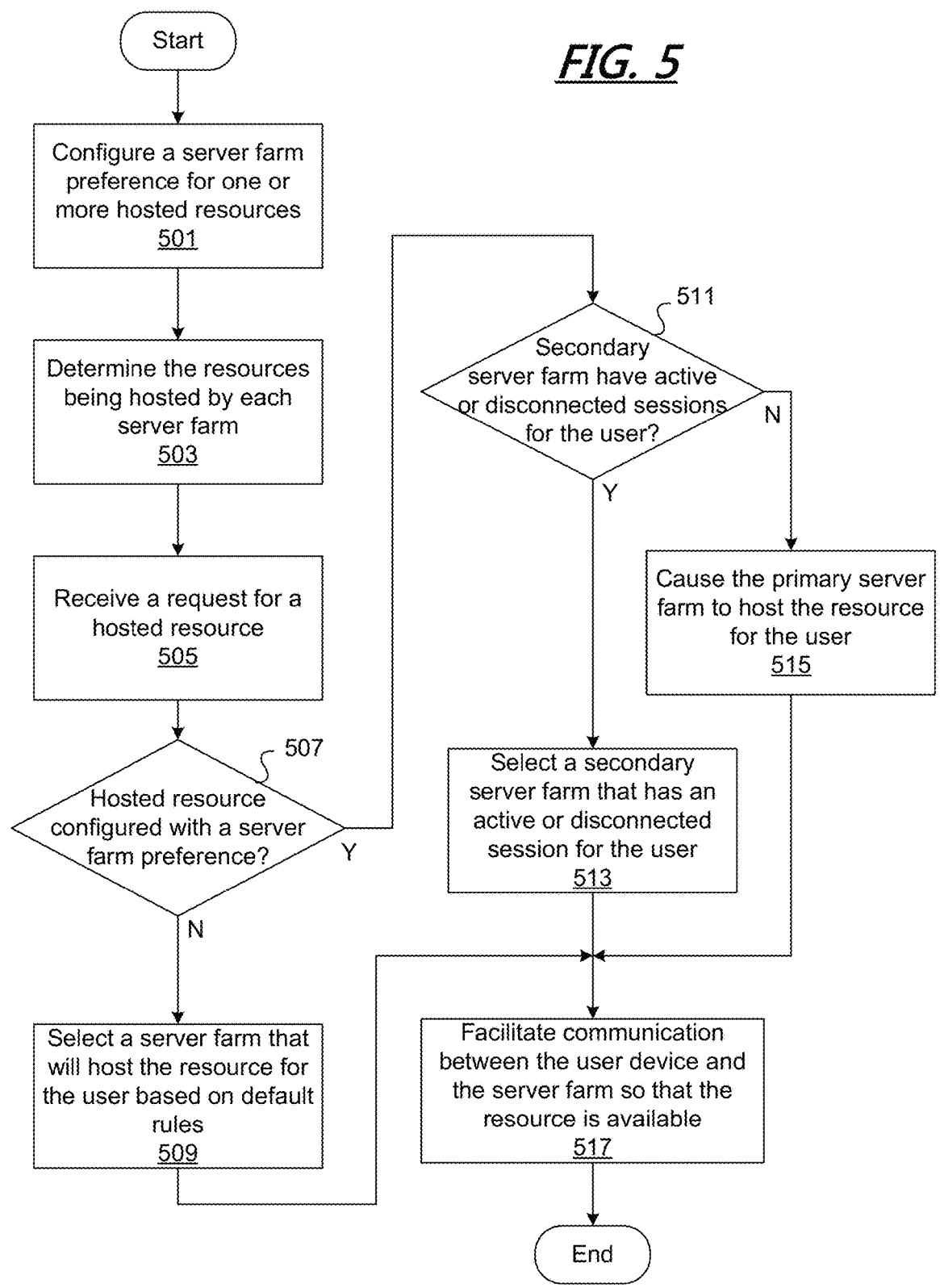
FIG. 5 illustrates an example method for providing a configurable server farm preference in accordance with one or more aspects described herein.
Figure 6:
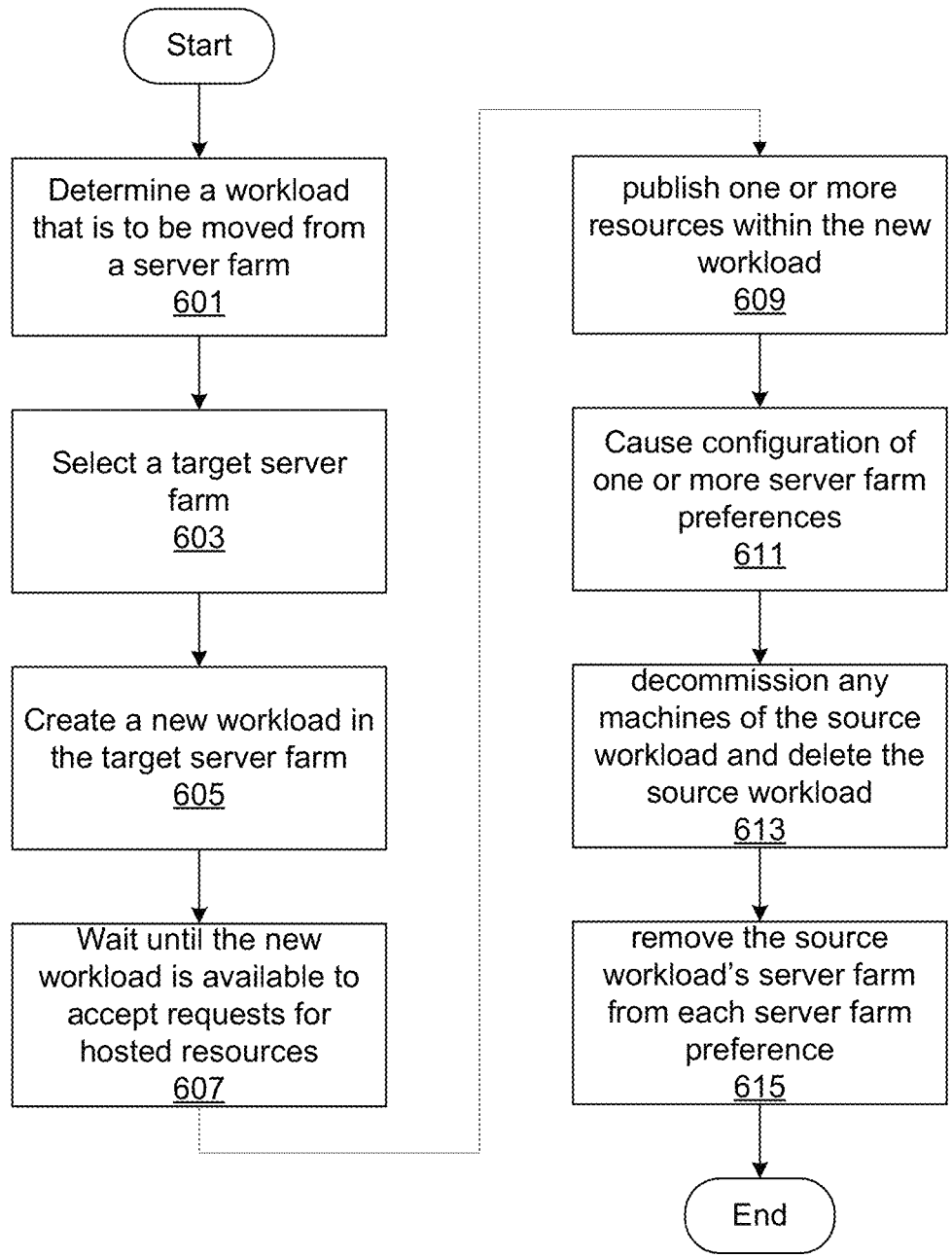
FIG. 6 illustrates an example method for moving server farm workloads based on a configurable server farm preference in accordance with various aspects described herein.

One or more aspects of this disclosure may relate to using a configurable server farm preference for an application, desktop or other hosted resource, and moving server farm workloads based on the configurable server farm preference. FIGS. 5 and 6 illustrate different aspects related to using a configurable server farm preference for an application, desktop or other hosted resource, and moving server farm workloads based on the configurable server farm preference. In particular, FIG. 5 illustrates an example method for providing a configurable server farm preference. FIG. 6 illustrates an example method for moving server farm workloads based on a configurable server farm preference.

In some embodiments, the method of FIG. 5 may be embodied as a first software service and the method of FIG. 6 may be embodied as a second software service. The first and second software services, in some instances, may be executed on different computing devices or servers. For example, the first software service may execute on a computing device such as a management server (e.g., management server 410 of FIG. 4), a gateway, an application store server, a user connection portal, or the like; and the second software service may executed on different computing device, such as a different management server. It should be noted, however, that in some embodiments, the first and second software services could be executed on the same computing device.

In connection with some of the aspects described in connection with the example methods of FIGS. 5 and 6, existing user sessions can be unaffected during a server farm transition period; disconnected user sessions on the source workload can still be reconnected-to during a transition period; new user sessions may be directed to a new farm; total capacity for user sessions may be undiminished during the transition period, which provides for a similar or the same level of user connectivity throughout the transition period.

With respect to FIG. 5, at step 501, a computing device may configure a server farm preference for one or more hosted resources. In some embodiments, a server farm preference may be configured for each hosted resource. Additionally, in some variations, the server farm preference may be configured so that it is resource-specific or on a per-resource basis (e.g., a first server farm resource is configured only for a first application only, a second server farm resource is configured only for a second application, etc.). In such variations, the server farm preference can be considered a per-application or application-specific server farm preference. While the examples throughout FIG. 5 and FIG. 6 will use the term "server farm preference," a per-application or application-specific server farm preference could similarly be used. The server farm preference may include (or specify) an indication of a primary farm and an indication of one or more secondary farms. In some arrangements, the secondary farms may be considered reconnect-only server farms.

In some embodiments, the hosted resource may be configured by the computing device to include the server farm preference and when the user launches the application, the user's device may transmit the server farm preference to the portal that the user's device connects to when attempting to launch the application. In other embodiments, configuring a hosted resource includes storing data in a table or some other type of database. The stored data may include the server farm preference and additional data associating the server farm preference with the hosted resource. The stored data can be accessed to locate the server farm preference of an associated hosted resource when a user launches or attempts to access the hosted resource (e.g., launch an application, launch a desktop, etc.).

At step 503, the computing device may determine the resources being hosted by each server farm. This may include querying each server farm and enumerate the applications being hosted by that server farm.

Optionally, the computing device, based on the received enumeration of applications being hosted by each server farm may perform various actions. For example, the computing device may cause duplicates to be deleted, disabled or otherwise eliminated from the server farms. A resource may be a duplicate, in one instance, if it is the same resource version and associated with the same user as another resource. The enumeration may be updated so that the duplicated resources are removed from the enumeration. As another example of the various actions the computing device may take based on the enumeration, the computing device may display or otherwise provide (e.g., store in a log) the received enumeration of applications being hosted by each server farm so that an administrator or other user may view or access the enumeration.

At step 505, the computing device may receive a request for a hosted resource (e.g., receive a session launch request associated with a user or user device). For example, the request for a hosted resource may be requesting or otherwise indicate that a session be launched and further indicate an application, desktop or other hosted resource for the session. The request for a hosted resource may include, in some variations, a server farm preference configured for the resource associated with the request, an identifier of the resource, an identifier of the user or user device, or other data. Steps 507-517 of FIG. 5 may, in some arrangements, be performed responsive to receipt of the request.

At step 507, the computing device may determine whether the hosted resource is configured with a server farm preference. In some embodiments, stored data (e.g., a table or other database) may be accessed and searched for the hosted resource (e.g., identify an entry in the table with an identifier of the hosted resource). If the hosted resource is found and is associated with a server farm preference, the computing device may determine that the hosted resource is configured with a server farm preference. In other embodiments, the computing device may receive, among other data, a server farm preference that was configured for the hosted resource (e.g., when launching the application, the user's device may transmit the server farm preference to the computing device). Based on the received server farm preference, the computing device may determine that the hosted resource is configured with a server farm preference.

If it is determined that the hosted resource is configured with a server farm preference, the method may proceed to step 511. Otherwise, the method may proceed to step 509.

At step 509, the computing device may, based on a set of default rules or configuration information different from the server farm preference, select a server farm that will host the resource for the user (e.g., in accordance with the request received at step 505) and cause the selected farm to host the resource for the user. In some variations, the set of default rules or configuration information may, for example, include existing logic for selecting a server farm on selected criteria such as load balancing criteria or workloads that are assigned to the server farms.

At step 511, the computing device may (e.g., in response to determining that the resource is associated or configured with a server farm) determine whether a secondary server farm has one or more active or disconnected sessions for the user. Such a determination may include querying each secondary or reconnect-only server farm that is included (or specified) in the server farm preference to determine if the second server farm has any active or disconnected sessions for the user. If at least one secondary server farm has at least one active or disconnected sessions for the user, the computing device may determine that the secondary server farm has one or more active or disconnected sessions for the user and, accordingly, may proceed to step 513. Otherwise, the method may proceed to step 515.

At step 513, the computing device may (e.g., in response to determining that a secondary server farm has one or more active or disconnected sessions for the user) select a secondary server farm that has an active or disconnected session for the user and may cause the secondary server farm to host the resource for the user (e.g., cause the secondary server farm to launch the application or desktop). In some variations, determination of step 511 may proceed bone secondary server farm by one secondary server farm (e.g., query in an order specified by the server farm preference). Once a secondary server farm is found to have at least one active or disconnected session for the user, the computing device may select that secondary server farm as the one to host the resource for the user. In other variations, the determination of step 511 may proceed by querying all secondary server farms, which may result in plural secondary server farms as having at least one active or disconnected session for the user. In such variations, the computing device may select one of the plural secondary server farms (e.g., based on load-balancing criteria, or some other criteria) to host the resource for the user.

At step 515, the computing device may (e.g., in response to determining that the secondary server farms do not have one or more active or disconnected sessions for the user) cause the primary server farm to host the resource for the user (e.g., cause the primary server farm to launch the application or desktop).

One or both of steps 513 and 515 may, in some variations, include transmitting an acknowledgement that the resource has been hosted.

At step 517, the computing device may facilitate communication between the user device and the server farm so that the resource is available. For example, in some variations an application may have been launched for the user and a user session may be active on a server farm. The computing device may transmit data to/from the server farm and user device so that the user can use the application as desired. Step 517 may be considered optional in some arrangements (e.g., step 517 may be performed when the computing device operates as a gateway or management server that resides between the user device and the server farm, but step 517 may be not performed in some variations where the computing device operates as a store front or application store).

The illustrated process of FIG. 6 may be executing separately or in parallel from the FIG. 5 process. For example, the process of FIG. 5 may be executed by a store front, user connection portal and/or other gateway, and the process of FIG. 6 may be executing by an application orchestration service (or other multi-product automation service) on a different computing device.

With respect to FIG. 6, at step 601, a computing device may determine a workload that is to be moved from a server farm (e.g., a source workload). In some instances the determination may be automated including, for example, when a server farm is over-capacity (e.g., based on server farm capacity criteria), when server farms are being load-balanced (e.g., based on load-balancing criteria), or when an allocation of the server farm changes (e.g., based on server-farm allocation criteria). The determination may also be manual such as, for example, when an administrator or other user directs the computing device to move a particular workload. For example, a user interface or command shell may be provided that allows input specifying a move operation, a source server farm, and a target server farm.

In some embodiments, determining a source workload may include monitoring one or more server farm to determine whether a total capacity is exceeded. When or if the total capacity of a farm is exceeded, one or more workloads may be determined to be moved until the over-capacity server farm is no longer over-capacity.

At step 603, the computing device may select a target server farm. In some variations, this may include moving the smallest workload(s) in the server farm. The selection may be conditioned upon the target server farm having sufficient remaining capacity to host the workload(s) being moved. Accordingly, the computing device may query each allocated server farm to determine each farm's current remaining capacity and select one based on the received remaining capacities. If there is no allocated server farm with sufficient remaining capacity, computing device may allocate a new server farm and use it as the target server farm.

At step 605, the computing device may create a new workload in the target server farm. The new workload on the target server farm may be configured to be the same or similar to the source workload. For example, the new workload may be created to include the same number of session-hosting machines as the source workload.

At step 607, the computing device may wait until the new workload is available to accept requests for hosted resources (e.g., session launch requests, and the like). In some instances, the computing device may additionally have to, for example, wait for the correct number of session-hosting machines to have been successfully allocated in the target server farm and workload, such that the total capacity for user sessions in the new workload is equal to the total capacity for user sessions in the source workload.

At step 609, the computing device may publish one or more resources within the new workload. In some embodiments, the resources that are published correspond to those in the source workload. For example, for each application and desktop in the source workload, a similar or identical application or desktop may be published in the new workload.

At step 611, the computing device may cause configuration of one or more server farm preferences. Configuring the one or more server farm preferences may include setting the indication of the primary server farm of each of the one or more server farm preferences equal to the target server farm. Configuring the one or more server farm preferences may also include setting the indication of the one or more secondary server farms of each of the one or more server farm preferences to include source workload's server farm. As one example, for an application that is published in the new workload, the computing device may interface with a software service (e.g., a store front, user connection portal or gateway) that is able to configure a server farm preference that is specific to the application. The interface may be via one or more using an application programming interface (API) calls and at least one of the calls may include an identifier of the target server farm.

At step 613, the computing device may monitor the source workload to decommission any machines in the source workload that have no active or disconnected session and to delete (or otherwise disable) the source workload upon determining that all machines in the workload have been decommissioned.

At step 615, the computing device may cause configuration of the one or more server farm preferences to remove the source workload's server farm from each server farm preference's indication of one or more secondary server farms.

As discussed above, maintenance operations that may need to be performed can include rebooting operations. The following examples will discuss features relating towards methods for performing a rebooting schedule and on-demand rebooting.

Throughout these examples, terms such as desktop groups and catalogs will be used. A catalog may be considered as a collection of virtual machines or physical machines that can be managed as a single entity. Examples of a catalog include a machine creation services (MCS) catalog and a provisioning services (PVS) catalog. After a catalog has been created, machines can be allocated into desktop groups which then can be used to deliver hosted resources to users. Machines can be of various types including power managed or non-power managed (also interchangeably referred to as unmanaged). Additional details related to the various types of machines that are contemplated and the different manner in which the types of machines are handled will be discussed in connection with the below examples.

Aspects related towards methods for performing a rebooting schedule and on-demand rebooting may, for example, allow for the regular, scheduled, reboots of machines in a desktop group (including non-power managed ones) so that, in some instances, faulty or hung applications or corrupt resource states can be cleared. Additional aspects related towards methods for performing a rebooting schedule and on-demand rebooting may, for example, to allow that machines in a catalog, such as a MCS or PVS catalog, are running the most current image for that catalog upon a next start-up or on-demand; thus, allowing, for example, controlled rollout of image updates to machines in a catalog.

Generally, to avoid overloading hypervisors with reboot storms or making all machines in a group unavailable at the same time, individual machine reboot operations can be staggered over a specified period of time (in some embodiments an administrator or other user may specify the period of time). Where shared resources are involved, it may be possible to guarantee that some resources are always available during the desktop group or catalog reboot.

As will be discussed further below, desktop group or catalog reboots may be initiated or otherwise configured via a command shell and/or a user interface.

Before discussing the details of a reboot schedule and on-demand rebooting, some of the concepts will be briefly introduced.

It is noted that while the term "reboot" is used throughout the examples, a shutdown rather than a reboot may be performed. It is also noted that multiple reboots of a single machine may need to be performed in some cases (e.g., to perform a Personal vDisk (PvD) image update). For simplicity, this disclosure uses the term "reboot" except, for example, where the detailed processing changes based on reboot, shutdown, etc. Thus, the term "reboot" should normally be understood to refer to single reboots, shutdowns or multiple reboots.

Catalog reboots and reboot schedules may include similar features. Performing either a catalog reboot or a reboot schedule includes performing one or more reboot cycles. A reboot cycle for a catalog reboot (e.g., a catalog reboot-initiated reboot cycle) may be performed similar to a reboot cycle for a reboot schedule (e.g., a reboot schedule-initiated reboot cycle).

Reboot cycles for reboot schedules and reboot cycles for catalog reboots may run concurrently. When running concurrently, some embodiments may make an effort to ensure that a given machine is processed only once (however, where PvD-based catalog reboot-initiated reboot cycles are involved, the same machine may be processed multiple times).

Multiple different catalog reboot-initiated reboot cycles may run concurrently on the same desktop group (and concurrently with a reboot schedule that designates the same desktop group). In some embodiments, however, a new catalog reboot-initiated reboot cycle cannot be initiated if any machines involved in a previous reboot of the new catalog remain in processing.

Where a reboot schedule is changed or a catalog reboot is initiated in such a way that another reboot cycle for the desktop group exists or is ongoing, the new cycle may not start until the ongoing one is complete. In other words, some embodiments may allow only a single schedule cycle to be active on a group at any given time.

Figure 7:
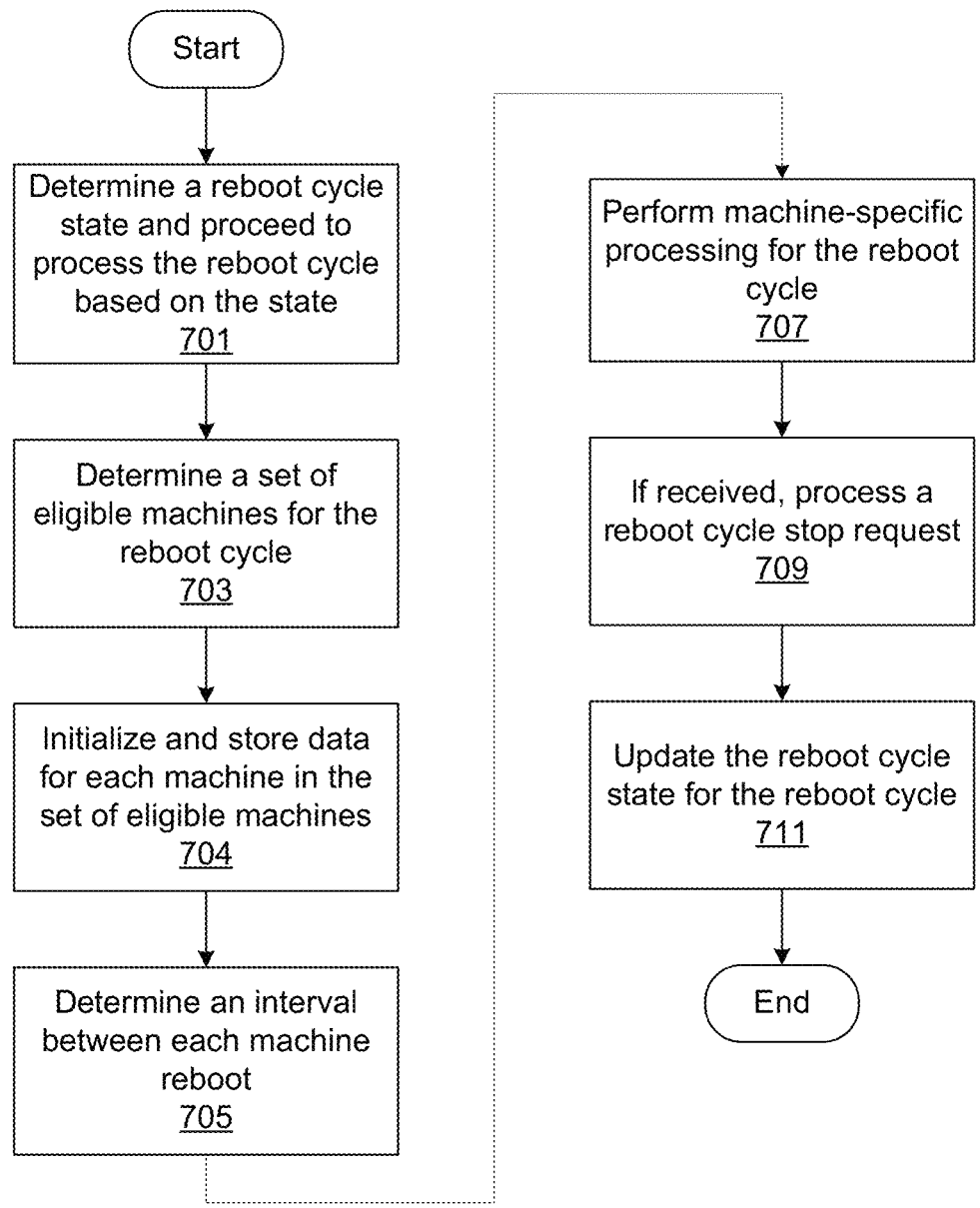
FIG. 7 illustrates an example method for performing a reboot cycle in accordance with various aspects described herein.

FIG. 7 illustrates an example method for performing a reboot cycle. In some embodiments, the steps of FIG. 7 may be performed by a reboot cycle management service. The service may be executed on a computing device operated by the server farms' provider. In some variations, the service may be configured to execute periodically such as, for example, based on a periodic (e.g., 30 second) interval service action callback. The reboot cycle management service may process all currently active reboot cycles within each action callback process. FIG. 7 illustrates an example method for processing a single reboot cycle during a single action callback.

At step 701, a computing device may analyze a reboot cycle table to determine its state and proceed to process the reboot cycle based on the state. In some embodiments, a reboot cycle may be considered an automated process in which machines can be rebooted (or shutdown, restarted, etc.). As will be discussed in connection with FIGS. 8 and 9, a reboot cycle can be initiated, activated or created by a reboot schedule or a catalog reboot. For example, the reboot schedule or catalog reboot can add an entry (or cause an entry to be added) to a reboot cycle table that includes reboot cycle configuration data. When the reboot cycle management service begins an action callback process, the entries of the reboot cycle table may be analyzed to determine a reboot cycle that has been initiated or is in an active state.

The reboot cycle table may include entries for each active cycle and a portion of historical data (e.g., entries for completed, cancelled or abandoned cycles). Additionally, each entry of the reboot cycle table may include the required data to track and manage the behavior of a reboot cycle. For example, an entry for a reboot cycle (either active or historical) may include some or all of the following:

A reboot cycle identifier: a unique identifier for the entry's reboot cycle. This identifier may be determined when the entry's reboot cycle was created (and unchanged thereafter).

A desktop group identifier: a unique identifier for the desktop group of the reboot cycle, if applicable. This identifier may have a value when the reboot cycle is a reboot schedule-initiated reboot cycle.

A catalog identifier: a unique identifier for the catalog of the reboot cycle, if applicable. This identifier may have a value when the reboot cycle is a catalog reboot-initiated reboot cycle. If the reboot cycle is a reboot schedule-initiated reboot cycle, this identifier may be null.

A duration: indicates a maximum duration of the reboot cycle.

A start time: a time at which the entry was created.

An end time: a time at which this entry's reboot cycle was completed, cancelled or abandoned (e.g., the time after which no further processing of the reboot cycle is to be performed). If the reboot cycle is still active, the end time may be set to null.

A phase one time: a time at which phase one processing started for this entry's reboot cycle. In some instances, this time is near the start time.

A phase start time: a time at which the current phase (e.g., phase one or phase two) processing started for this entry's reboot cycle.

A reboot cycle state: the current state of this reboot cycle. This state may have a value dependent on how far along the reboot cycle's processing is including, for example, one or more values for when the reboot cycle is a new cycle that needs to be initialized, one or more values for when the reboot cycle is active, and one or more values for when the reboot cycle has finished. With respect to the examples of this disclosure the following state enumeration will be used (although other enumerations are possible): pending, phase one, checkpoint, phase two, complete, cancelled, abandoned.

The "pending" state represents a new cycle that needs to be initialized. The reboot cycle state may be set to the "pending" state when the entry has been created but the reboot cycle has not yet begun processing (e.g., the set of eligible machines has not yet been created).

The "phase one" state, the "checkpoint" state and the "phase two" state each represent that the reboot cycle is active. The reboot cycle state may be set to the "phase one" state when phase one processing is active (where applicable). The reboot cycle state may be set to the "checkpoint" state when the reboot cycle is waiting at a checkpoint (where applicable). The reboot cycle state may be set to the "phase two" state when phase two processing is active (where applicable). Where phase one and/or checkpoint processing does not apply, the phase two state may indicate normal processing.

The "complete" state, the "cancelled" state and the "abandoned" state each represent that the reboot has finished. The reboot cycle state may be set to the "complete" state when the reboot cycle is complete (e.g., reboot cycle processing has been attempted for each eligible machine of the reboot cycle). The reboot cycle state may be set to the "abandoned" state when the reboot cycle has timed out (e.g., reboot cycle processing has not been attempted for each eligible machine of the reboot cycle within a time out condition).

A pending cancel data field: indicates that a stop request has been issued for this entry's reboot cycle (e.g., via a command shell, user interface, or software development kit (SDK)). In some arrangements, reboot cycle processing may not halt until the next poll of the reboot cycle management service, at which time the reboot cycle state may transition to "cancelled."

A checkpoint time: a time at which this entry's reboot cycle will enter a checkpoint wait state. This time may be initialized to the start time of the reboot cycle. This time may be set or its value overwritten when a batch of machines are put into wait states for the reboot cycle based on the reboot interval and the overall reboot cycle duration.

A checkpoint deadline: indicates the deadline before which at least one machine that was restarted during phase one processing must enter the "rebooted" state. If no machine enters this state prior to the deadline, the reboot cycle may be abandoned. The deadline may be set based on machine specific rules and other configuration data (e.g., one or more registry entries that specify a maximum time a machine has to reboot before it is deemed to have failed). If the reboot cycle does not require a checkpoint, or where the machine has successfully rebooted as a result of the reboot cycle, the checkpoint deadline may be set to null.

A reboots pending count: provides a count of outstanding machines to be rebooted/shutdown during this entry's reboot cycle but on which processing has not yet started. This count may be set to zero once the reboot cycle has completed. During the reboot cycle, the value of this count may be dynamically maintained.

A reboots in progress count: provides a count of machines issued with reboot/shutdown requests but which have not yet completed the operation. During the reboot cycle, the value of this count may be dynamically maintained.

A reboots completed count: a count of machines successfully rebooted during this entry's reboot cycle. During the reboot cycle, the value of this count may be dynamically maintained.

A reboots failed count: a count of machines issued with reboot requests where the request failed or the operation did not complete within the allowed time. During the reboot cycle, the value of this count may be dynamically maintained.

A reboots skipped count: a count of machines scheduled for reboot during this cycle but which were not processed because the reboot cycle was cancelled or abandoned. During the reboot cycle, the value of this count may be dynamically maintained.

A message data field: includes text for display in user sessions on a machine that is to be rebooted. The text may be displayed prior to the reboot operation itself. The message may be displayed at the number of minutes specified in the grace period parameter prior to the reboot (e.g., prior to the time the reboot request is to be sent to the machine).

A title data field: includes text for a title of a window in which the text of the message data field is displayed in user sessions. If not specified, the window title may be blank.

A grace period parameter: a time (in minutes) that any text of the message data field is displayed prior to a reboot.

To determine the state of a reboot cycle, the computing device may, for example, the reboot cycle state parameter may be analyzed. Processing of the reboot cycle that is performed may be dependent on the value of the reboot cycle state parameter. For example, if the reboot cycle state parameter indicates the reboot cycle is in the "pending" state, the method may proceed to step 703. If the reboot cycle state parameter is in the "phase one" state, the "phase two" state, or the "checkpoint" state, the method may proceed to step 705. If the reboot cycle state parameter is in the "complete" state, the "canceled" state, or the "abandoned" state, the method may end.

In some arrangements, the data of each entry for a reboot cycle may be encapsulated by an instance of an SDK object so that the SDK can create an entry, access, or manipulate the data of the entry.

At step 703, the computing device may determine a set of eligible machines for the reboot cycle. The set of eligible machines may be determined only once (e.g., only in response to the reboot cycle being in the "pending" state) and, due to this, any machine added to a desktop group or catalog once the reboot cycle processing is active (e.g., in the "phase one" state, the "checkpoint" state, and the "phase two" state) may not be processed by the reboot cycle.

Determining a set of eligible machines may depend on whether the reboot cycle is a desktop group-initiated reboot cycle or a catalog reboot-initiated reboot cycle. In some embodiments, determining a set of eligible machines may also depend on the types of machines in the reboot cycle or catalog. Generally, however, a set of eligible machines may include all or a subset of machines within a desktop group. Determining the set of eligible machines may, in some variations, include determining whether the reboot cycle is a desktop group-initiated reboot cycle or a catalog reboot-initiated reboot cycle, proceeding to determine if each machine in the desktop group should be added to the set of eligible machines by applying appropriate desktop group-specific rules, catalog-specific rules and/or machine type-specific rules, and updating the count parameters for the reboot cycle based on whether each machine was included in the set of eligible machines (e.g., if the machine is added to the set of eligible machines, increment the reboots pending count parameter and if the machine not added to the set of eligible machines, increment the reboots skipped count parameter).

After step 703 has been completed, the count parameters for the reboot cycle (e.g., the reboots pending count parameter, the reboots in progress count parameter, the reboots completed count parameter, the reboots failed count parameter, and the reboots skipped count parameter, as discussed above) may add up to the total number of machines in the reboot cycle's desktop group.

For a desktop group-initiated reboot cycle, the eligible set of machines may include the machines of the specified desktop group (e.g., the group specified by the desktop group identifier of the reboot cycle) that are considered "on." For example, for power managed machines, any machine that is not in power state "off" or "turning off" may be considered "on" and, therefore, may be added to the set of eligible machines. For unmanaged machines, any machine that is registered with the desktop group may be considered "on" and, therefore, added to the set of eligible machines.

For a catalog reboot-initiated reboot cycle, the set of eligible machines may include any or all machines in the catalog that are not in a power state of "off" and are also members of the desktop group.

Once the set of eligible machines is determined, the method may proceed to step 704.

At step 704, the computing device may initialize and store data for each machine in the set of eligible machines. In some arrangements, this may include adding an entry to one or more machine data tables. For example, in some variations, there may be two machine-specific data tables: a reboot cycle machines table, which includes an entry for each machine in each reboot cycle that the machine is currently a part of; and a machines state table, which includes only one entry for each machine (e.g., if a machine is involved in two reboot cycles, the machines state table may include only one entry for the machine, while the reboot cycle machines table may include a first entry for the machine specific to the first reboot cycle, such as a reboot schedule-initiated cycle, and a second entry for the machine specific to the second reboot cycle, such as a catalog reboot-initiated cycle).

Each entry for the reboot cycle machines table may include some or all of the following parameters:

A machine table reboot cycle identifier: a unique identifier of the reboot cycle to which this entry relates.

A machine table machine identifier: a unique identifier of the machine to which this record relates.

A machine table eligible set indicator: indicates whether the machine is in the set of eligible machines for the reboot cycle or not. In some arrangements, this can be set to false only for PvD catalog reboot cycles.

A machine cycle state: indicates the state of the machine with respect to this reboot cycle. The value of this state can be selected from an enumeration such as, for example, a "waiting" state, a "notified" state, a "reboot pending" state, a "rebooted" state, a "completed" state and a "failed" state.

The "waiting" state may represent that the machine is waiting to be processed for this reboot cycle. In some arrangements, new session launches may be disabled while in this state.

The "notified" state may represent that a notification message has been sent to the machine and that the machine is in the grace period between sending the notification and its reboot time.

The "reboot pending" state may represent that reboot processing for the machine has been initiated and is awaiting completion.

The "completed" state may represent that the reboot processing for the machine has been complete.

The "failed" state may represent that the reboot processing for this machine has failed.

A last state change time: a time at which the machine cycle state was last changed. In some embodiments, reboot processing for the machine may depend on the last state change time while in the "notified" and "pending reboot" states. However, some variations may update this time for all states for diagnostic purposes.

In some arrangements, the data of each entry of the reboot cycle machines table may be encapsulated by an instance of an SDK object so that the SDK can create an entry, access, or manipulate the data of the entry.

The machine state table includes data that us usable to control exclusive access to a machine by only one reboot cycle at a given time. In some arrangements, a reboot cycle may require exclusive access to a machine if, for example, new sessions are disabled on the machine by virtue of a reboot cycle; the machine has been sent a notification message and is still within the following grace period; or the machine is actively being rebooted. Each entry for the machines state table may include some or all of the following parameters:

A machine state table reboot cycle identifier: a unique identifier that has exclusive control of the machine. This identifier may, in some variations, be set to zero if there is no reboot cycle that has control of the machine (e.g., the machine may be in a set of eligible machines and awaiting processing).

A draining until reboot parameter: indicates that new session launches on the machine are disabled due to a pending reboot cycle reboot of this machine. In some embodiments, this parameter may be used when a reboot cycle processes machines with shared resources. In some variations, if the machine state table reboot cycle identifier is zero (or some other value that indicates no machine has exclusive control), this parameter may be set to false.

A last reboot time: a time at which the machine was determined to have last rebooted. In some variations, this time may be set by a registration or power management service (e.g., as included in a broker service that processes power operations).

In some arrangements, the data of each entry of the machine state table may be encapsulated by an instance of an SDK object so that the SDK can create an entry, access, or manipulate the data of the entry.

The start time of the reboot cycle may be set to the current time, in some embodiments, at or during one of the processes discussed in connection with step 703 or step 704.

At step 705, the computing device may determine an interval between each machine reboot. Generally, the reboots commands for the machines in the set of eligible machines will be transmitted in a staggered fashion that is based on the determined interval. The interval may be determined based on the duration of the reboot cycle and a number of machines that depends on whether the reboot cycle is a reboot schedule-initiated reboot cycle or a catalog reboot-initiated reboot cycle.

For reboot schedule-initiated reboot cycles, the interval may be determined by taking the difference between the duration of the reboot cycle and the grace period of the reboot cycle, and dividing the difference by the total number of machines in the desktop group.

For catalog reboot-initiated reboot cycles, the interface may be determined by taking the difference between the duration of the reboot cycle and the grace period of the reboot cycle, and dividing the difference by the total number of machines in the desktop group that are also members of the catalog.

At step 707, the computing device may perform machine-specific processing for the reboot cycle. During a reboot cycle, an attempt may be made to reboot all machines in the set of eligible machines. The machine-specific processing that is performed in a specific machine in the set is, in general, desktop group-, catalog- and machine-type specific. Further, since each machine may begin to be rebooted in a staggered fashion (e.g., based on the interval of step 705), processing of each machine may be independent and asynchronous from each other, and some machines may be available for user sessions during the reboot cycle.

The machine-specific processing may include selecting a machine from the set of eligible machines (e.g., randomly), determining the machine cycle state of the selected machine, and processing the machine based on its machine cycle state.

For example, if the machine is in the "waiting" state, processing the machine based on its machine cycle state may include determining whether to begin reboot processing for the machine (e.g., to enter the "notified" state, if applicable, or enter the "reboot pending" state).

Determining whether to begin reboot processing for the machine may be dependent on the machine being available. A machine may be unavailable, for example, if the machine is in a maintenance mode from a different service (e.g., in a FlexCast Management Architecture (FMA) maintenance mode) or is a particular type of machine considered to be unavailable (e.g., an unregistered physical machine). A machine may be available, for example, if the current reboot cycle has exclusive control over this machine based on the machine state table (e.g., the machine state table reboot cycle identifier matches the reboot cycle identifier for the reboot cycle or the machine table reboot cycle identifier for the machine) or if it is determined that it is otherwise not unavailable. In embodiments where determining whether to begin reboot processing dependent on availability of the devices, any machine remaining at the end of the reboot cycle that is unavailable and was not processed during the reboot cycle (e.g., remained in "waiting" state) may be recorded as a skipped machine in the appropriate count parameter.

Additionally or alternatively, determining whether to begin reboot processing for the machine may be dependent on the interval between each machine reboot. If the interval since a command to reboot the previously-selected machine in the set of eligible machines has not expired, the computing device may end machine-specific processing for this machine (or wait until the interval has expired). The interval since a command to reboot the previously-selected machine may be determined, for example, based on the count parameters of the reboot cycle, the current time, the start time of the reboot cycle.

Moreover, determining whether to begin reboot processing for the machine may be dependent on the machine needing processing. For example, a last recorded shutdown time may be determined and if that time is later than the start time of the reboot cycle, then no action may need to be performed for this machine (and such a finding may be recorded by incrementing the reboots completed count parameter and placing the machine in the "completed" state). The last recorded shutdown time may be determined differently based on whether the machine is power managed or unmanaged. For example, if power managed, the time of the last transition to the power state of "off" may be taken as the last record shutdown time. If unmanaged, the time of the last registration may be taken as the last record shutdown time but, in some variations, only if the last recorded reason for deregistration was "agent shut down."

If the machine is to enter the "notified" state (the "notified" state may be optional or not included in some variations, such as when it is not desired to send a notification message to user sessions of the machine), the computing device may transmit a notification to one or more user sessions of the machine. The notification message may include parameters such as the message and title data fields, and the grace period. If a machine has no user sessions at the time it is selected for notification, no notification message may be sent.

If the machine is in the "notified" state, processing the machine based on its machine cycle state may include determining whether the grace period has expired. Determining whether the grace period has expired may be based on the grace period and the last state change time parameter. If the grace period has expired, the computing device may issue one or more commands to cause rebooting of the machine. The types and numbers of commands that are sent may be dependent on the machine type.

For example, shutdown and/or restart power operations (e.g., hypervisor power management operations) may be issued for power managed machines and queued with other power operations issued from other sources, such as a broker service. Such power operations may be in accordance with an existing priority management of power operations. However, in some variations, where power operations are ignored or cannot be queued due to the presence of higher priority pending operations, an error may not be generated for this machine. In such variations, the machine may be placed and/or remain in the "reboot pending" state on the basis that a reboot may occur for other reasons which will satisfy the requirements of the "reboot pending" state. An example priority interaction between power operations issued by a reboot cycle and pending operations from other sources is illustrated in FIG. 10.

As another example, a reboot request may be sent to a physical machine.

Some power operations may need to be processed via an ICA stack (e.g., for non-MCS catalogs). In such instances, the broker may not be able to reboot a machine.

Upon sending the appropriate commands, the computing device may cause the machine to enter the "reboot pending" state.

Some variations require that if a machine in the "notified" state is found to have no user sessions on it, the machine may be moved to the "reboot pending" state without waiting for expiration of the grace period.

If the machine is in the "reboot pending" state, the computing device may, for example, determine whether the reboot has completed or failed. To determine if the machine has completed may be based on the last reboot time parameter and/or the last state change time parameter. If complete, the reboots completed count parameter may be incremented and the machine's state may be set to the "complete" state.

The machine may have failed if an error code has been generated (the failure may be recorded by incrementing the reboots failed count parameter and setting the machine's state to "failed" state).

Any machine that remains in the "reboot pending" state upon expiration of the duration of the reboot cycle may be recorded by incrementing the reboots failed count parameter For simplicity, the remaining portion of the various desktop group-, catalog-, and machine-type specific rules that can be used when performing machine-specific processing will be organized into separate discussions of the rules for reboot schedule-initiated reboot cycles and the rules for catalog reboot-initiated reboot cycles. The machine type-specific rules will be discussed throughout the various examples. Additionally, it is noted that while various example rules are discussed in terms of only a reboot schedule-initiated reboot cycle or a catalog reboot-initiated reboot cycle, the examples may be usable for the other type of reboot cycle under certain conditions.

With respect to reboot schedule-initiated reboot cycles, some of the below described examples may include use of a "reboot maintenance mode." While in the reboot maintenance mode, brokering (or launching) of new sessions to a machine may be disabled or otherwise prevented. However, reconnecting to existing sessions may be allowed while in the reboot maintenance mode.

With respect to shared remote desktop services (RDS) machines for rebooting by a reboot schedule-initiated reboot cycle, the processing the set of eligible machines may be divided into three parts: phase one (which may use the "phase one" state); checkpoint (which may use the "checkpoint" state); and phase two (which may use the "phase two" state).

When in phase one, a subset of machines may be selected from the set of eligible machines by excluding all unavailable machines and then selecting half of those remaining. Machines in this subset may be placed in the reboot maintenance mode and this subset then proceeds through machine-specific processing. Once processing on all machines in the subset has been notified or the reboot is at least pending, phase one can be considered complete.

Once phase one ends, the checkpoint may begin. Further processing may wait until at least one of the machines processed in phase one is available for new session brokering (as reported by the virtual desktop agent (VDA)). If the checkpoint wait does not complete within a timeout period, then the reboot cycle may be abandoned. Unprocessed machines from phase one may be recorded in the reboots skipped count parameter for the reboot cycle and any machine still pending from phase one may be recorded in the reboots failed count parameter for the reboot cycle.

Phase two may begin when the checkpoint ends. While in phase two, all machines in the set of eligible machines that were not selected in phase 1 may be placed into reboot maintenance mode and proceed through machine-specific processing.

Machine specific processing for shared RDS machines may proceed in phase one and phase two as follows. If the machine is power managed, it may be first shutdown and following a successful transition to the power state "off" they may be restarted. Processing may be deemed complete if the shutdown succeeds (in some variations the restart operation may not be monitored). If the machine is unmanaged, it may be rebooted. Processing may be deemed complete if subsequently a last shutdown time is recorded for the machine that post-dates the reboot request.

When processing of each individual machine is complete or has failed, it may be removed from the reboot maintenance mode.

In some embodiments, neither idle pool nor policy-based power management may be supported for desktop groups that include RDS machines. Accordingly, only automatic power management operations being performed are those related to reboot cycle processing.

With respect to shared virtual desktop infrastructure (VDI) machines for rebooting by a reboot schedule-initiated reboot cycle, the processing the set of eligible machines may be divided into three parts: phase one (which may use the "phase one" state); checkpoint (which may use the "checkpoint" state); and phase two (which may use the "phase two" state).

When in phase one, a subset of machines may be selected from the set of eligible machines by excluding any unavailable machine and then selecting half of those remaining. Machines in this subset may be placed into the reboot maintenance mode. The machines of this subset may then be subject to machine-specific processing. Once processing on all machines has started (e.g., notified or a reboot pending), phase one may end. Upon ending of phase one, the checkpoint may begin. In the checkpoint, further processing may wait until the number of machines successfully rebooted is greater than the number on which reboot processing is still pending or in progress (such a condition is based on the power management of shared VDI machines). If the checkpoint wait does not complete within a timeout period then the reboot cycle may be abandoned. Any unprocessed machine in the subset may be recorded by setting the reboots skipped count parameter for the reboot cycle. Any machine still pending may be recorded by setting the reboots failed count parameter. After phase one and the checkpoint have ended, all machines in the set of eligible machines that selected during phase one may be placed into the reboot maintenance mode and proceed through machine-specific processing.

Machine specific processing for shared VDI machines may proceed in phase one and phase two as follows. For machines that are power managed, it may be shutdown. Processing may be deemed complete if the machine successfully transitions to the power state "off." For machines that are unmanaged, it may be rebooted. Processing may be deemed complete if subsequently a last shutdown time is recorded for the machine that post-dates the reboot request.

When processing of each individual machine is complete or has failed, it may be removed from the reboot maintenance mode.

In some embodiments, interaction with the desktop group's idle pool management is required when performing a shutdown. For example, as machines are shut down, the desktop group's idle pool management may start new machines to maintain required levels. These new machines may not be from the set of eligible machines (e.g., the set of eligible machines only includes those that were originally running) so, accordingly, the reboot cycle may not perform a reboot/shutdown on the new machines.

With respect to private VDI machines for rebooting by a reboot schedule-initiated reboot cycle, machine-specific processing may proceed as follows. If the machine is power managed, it may be shutdown and following successful transition to the power state "off" may be restarted. Processing may be deemed complete if the shutdown succeeds (success of the restart may not be monitored in some variations). If the machine is unmanaged, it may be rebooted. Processing may be deemed complete if a last shutdown time is recorded for the machine that post-dates the reboot request. In some embodiments, the reboot maintenance mode may not be used for private VDI machines.

In some embodiments, power operation priority handling may be used to resolve any conflict that could occur if a reboot cycle coincided with a change between peak and off-peak hours. Accordingly, some variations do not build in specific consideration to the interaction of the power management that may be applied to private VDI groups and that may be required for reboot cycle power management.

Figure 11:
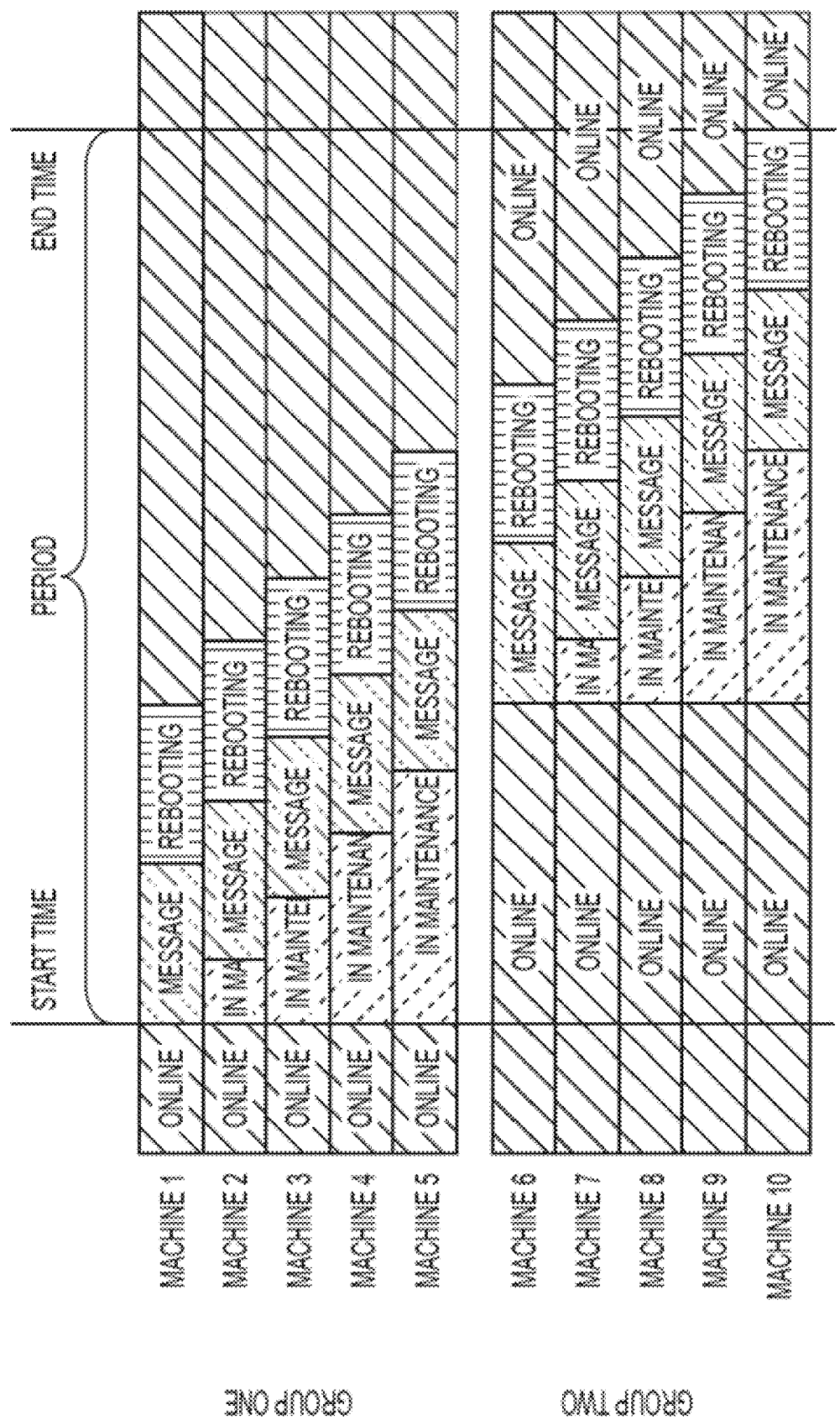
FIG. 11 depicts an illustration of a set of eligible machines being divided into two groups and proceeding through a reboot cycle

As described in the above examples, a set of eligible machines may be, based on the machine type, divided into two groups. This may increase the availability of resources during the reboot cycle (generally at least half of the machines are available for new sessions during a reboot cycle and other machines may available for reconnections). FIG. 11 depicts an illustration of a set of eligible machines being divided into two groups and proceeding through a reboot cycle.

With respect to catalog reboot-initiated reboot cycles, some embodiments may include specific rules for MCS and PVS power managed catalogs. For example, reboot cycle that is to perform a PvD update process to MCS and/or PVS power managed catalogs may require a number of specific rules when a machine is proceeding through machine-specific processing. When performing PvD update processes, existing PvD support of the broker service may be used (e.g., PvD stage functionality, PvD update management).

With respect to performing a PvD update processes in connection with a catalog reboot-initiated reboot cycle, machine-specific processing may proceed on a set of eligible machines as follows: If a machine is not in the power state "off" and is in the PvD stage "requested" it may be shutdown. If the shutdown does not complete within an allowed time period, the reboots failed count parameter may be incremented for the reboot cycle. Once a machine is shut down and in PvD stage "requested" control of the image update process may be handled by the broker service's PvD update management, which in some instances may require performing multiple reboots. The machine-specific processing may wait for the machine to transition to PvD state "none" and if this occurs within an allowed time period, the reboots completed count may be incremented. Otherwise, the reboots failed count parameter may be incremented.

In some embodiments, PvD image update processing may result in reboot cycles that act on machines not in the set of eligible machines. The machine-specific processing of machines not in the set of eligible machines may include only waiting for the machine to transition to PvD stage "none" and if this occurs within an allowed time period the reboots completed count parameter may be incremented. Otherwise, the reboots failed count parameter may be incremented.

Additionally, when the image update process is handled by the broker service's PvD update management, additional machines (e.g., those that were in the power state "off") may be restarted in order to perform PvD image updates. The rate at which these machines are restarted may be determined by the configured hypervisor throttling parameters and not by the specified duration of the reboot cycle or catalog reboot.

At step 709, the computing device may process a reboot cycle stop request if a stop request has been received. In some variations, an SDK call may be able to request that a reboot cycle be canceled or stopped. To determine whether a request has been received, the pending cancel data field may be analyzed. If a request has been received, the reboot cycle state may be set to "cancelled." In some variations, step 709 may be performed at the beginning of a callback action, instead of towards the end as illustrated in FIG. 7.

At step 711, the computing device may update the reboot cycle state for the reboot cycle. This may include, for example, analyzing the data of the various entries of the reboot cycle table, the reboot cycle machines table, and the machine state table, to determine the reboot cycle state (some of which may have been updated/modified during the reboot cycle initializing or machine-specific processing). For example, the reboot cycle state may be based on the count parameters for the reboot cycle, the various start and end time parameters for the reboot cycle, and the like.

Throughout the reboot cycle, the computing device may be maintaining the data stored in the various tables, including the reboot cycle table, reboot cycle machines table, and the machine state table. While a few instances are discussed where the computing device may initialize, set or modify a particular parameter in the table, many other instances are omitted for simplicity. To maintain the data stored in the various tables, the computing device may perform one or more consistency checks or error checking routines to determine whether the values of the various parameters are consistent with each other.

A reboot schedule can be applied to various types of desktop groups including private desktop groups, shared desktop groups, VDI desktop group, RDS desktop group, or application desktop groups. A reboot schedule may cause a reboot cycle to be initiated on the designated desktop group at the scheduled time.

If a scheduled start time is missed (e.g., the farm is down for maintenance), a reboot cycle according to the reboot schedule may be started as soon as possible afterwards. If multiple consecutive start-times are missed some embodiments may handle such cases as though only a single scheduled time was missed.

In some variations desktop groups cannot be rebooted using a catalog reboot (e.g., they cannot be rebooted on-demand but can be rebooted using a reboot schedule). Similarly, in some variations, catalogs cannot be rebooted using a reboot schedule but can be rebooted using a catalog reboot (e.g., they cannot be rebooted using a reboot schedule but can be rebooted "on-demand").

Figure 8:
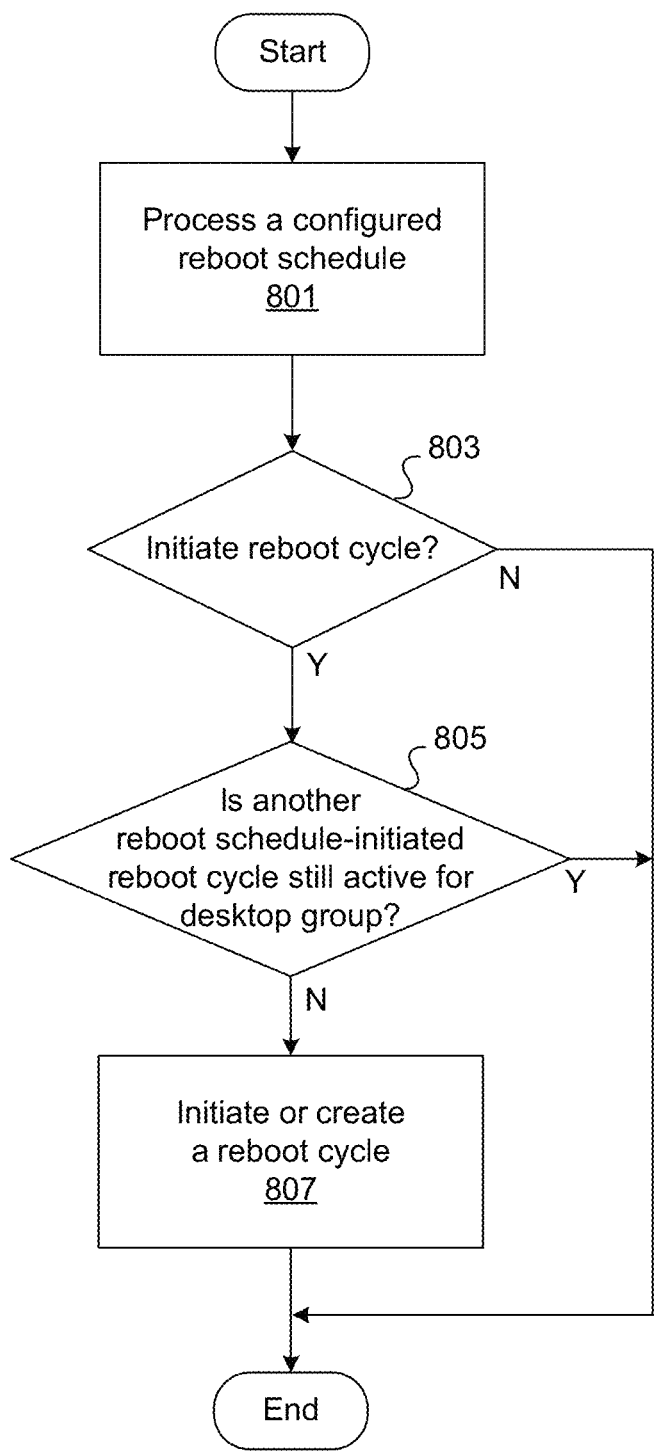
FIG. 8 illustrates an example method for performing a reboot schedule in accordance with various aspects of the disclosure.

FIG. 8 illustrates an example method for performing a reboot schedule. In some embodiments, the steps of FIG. 8 may be performed by a reboot schedule management service. The service may be executed on a computing device operated by the server farms' provider. In some variations, the service may be configured to execute periodically such as, for example, based on a periodic (e.g., 30 second) interval service action callback.

At step 801, a computing device may process a configured reboot schedule. In general, the reboot reschedule management service may process pre-configured reboot schedule data. The reboot schedule data may be configured in various ways. For example, a command shell or user interface may be provided that allows an administrator or other user to specify or configure the conditions upon which a reboot schedule should be performed. The configured reboot schedule data may be stored in two tables: a reboot schedule configuration table and a reboot schedule state table. In some arrangements, the data of each entry of the machine state table may be encapsulated by an instance of an SDK object so that the SDK can create an entry, access, or manipulate the data of the entry.

The reboot schedule configuration table and the reboot schedule state table may include all or some of the following parameters:

- A reboot schedule identifier: a unique identifier for the reboot schedule. This parameter may be allocated with the reboot schedule is created.
- A reboot schedule desktop group identifier: a unique identifier of the desktop group to which this schedule relates.
- A frequency parameter: a frequency with which this reboot schedule runs (e.g., weekly, daily, etc.).
- A day parameter: for longer frequency schedules (e.g., weekly), the day of the week on which the reboot schedule is to initiate a reboot cycle.
- A time parameter: a time of the day at which the reboot schedule is to initiate the reboot cycle.
- A reboot schedule duration parameter: an approximate maximum duration over which the scheduled reboot cycle runs. The reboot cycle may complete more quickly than the duration for various reasons (e.g., there are less machines in the set of eligible machines than in the desktop group, which may cause the reboot cycle to finish earlier than the reboot schedule duration).
- A reboot schedule message parameter: a warning message displayed in user sessions on a machine scheduled for reboot. If the message is blank, or the grace period for the reboot schedule is zero, some variations may not display a message.
- A reboot schedule grace period parameter: a time prior to a machine reboot at which a warning message may be displayed to all user session on that machine that is to be rebooted.
- A reboot schedule last run time parameter: a time at which a reboot cycle was last started as a result of the reboot schedule. In some variations, this parameter may be maintained by the reboot schedule management service.

The processing performed at step 801 may require pre-configured reboot schedule data in some embodiments because action callbacks may work independently from each other and any needed data may be derived from the data that is stored in the various tables.

At step 803, the computing device may monitor a system time to determine whether a reboot cycle should be initiated in accordance with the reboot schedule. Determining whether a reboot cycle should be initiated may be based on the reboot schedule data that was configured at step 801 and other data such as a per-desktop group time zone value. If a reboot cycle should be initiated, the method may proceed to step 805. Otherwise, the method may end.

At step 805, the computing device may determine whether another reboot schedule-initiated reboot cycle is still active or in progress for the desktop group specified by the reboot schedule. In some variations, a reboot cycle may not be created for a desktop group if another reboot schedule-initiated reboot cycle is still active or in progress for that group. Accordingly, if there is not another reboot schedule-initiated reboot cycle that is active or in progress, the method may proceed to step 807. Otherwise, the method may end.

At step 807, the computing device may initiate or create a reboot cycle. In some variations, this may include adding an entry to the reboot cycle table for the reboot cycle and initializing various parameters of the created entry in accordance with the parameters of the reboot schedule. For example, the entry for the reboot cycle may be configured with the duration, grace period, etc., of the reboot schedule. Other parameters of the entry for the reboot cycle may be initialized based on system data, such as by determining the reboot cycle identifier, and the like.

Resulting from the initialization of the reboot cycle, a reboot cycle management service may begin processing the reboot cycle (e.g., via a method similar to FIG. 7).

In addition to the reboot cycle management service, a purge service may be executing. The purge service may purge or delete completed, cancelled or abandoned reboot cycles from the tables after a configurable period. For example, the configurable period may be set for 1 week so that the completed, cancelled, or abandoned reboot cycles are retained for 1 week. The configurable period may be stored in a registry variable labeled "RebootCycleDataLifetimeHours."

A catalog can be rebooted on-demand (e.g., catalog reboots), such by using one or more SDK calls. A catalog reboot may cause one or more reboot-cycles to be initiated where each cycle operates on a desktop group that includes machines from the catalog that requires processing.

Rebooting catalogs according to the methods described herein can, in some embodiments, allow for machines in a catalog, such as a non-PvD catalog, to run the most recent image for that catalog or be shutdown such that on the next start-up the most recent image will be used. Rebooting catalogs according to the methods described herein can also, in some embodiments, allow for machines in a catalog, such as a PvD catalog, to run the most recent image for that catalog and perform all PvD image updates.

In some variations, catalog reboots can be applied only to certain catalog types such as MCS provisioned catalogs (with or without PvD) and PVS provisioned catalogs (with or without PvD).

In some arrangements, a catalog reboot may not make use of information relating to whether the image on any given machine is up to date (e.g., a catalog reboot may be performed on a machine without determining whether the image of the machine is up to date). Instead, the catalog reboot may operate under the assumption that machines should, where possible, be rebooted.

Figure 9:
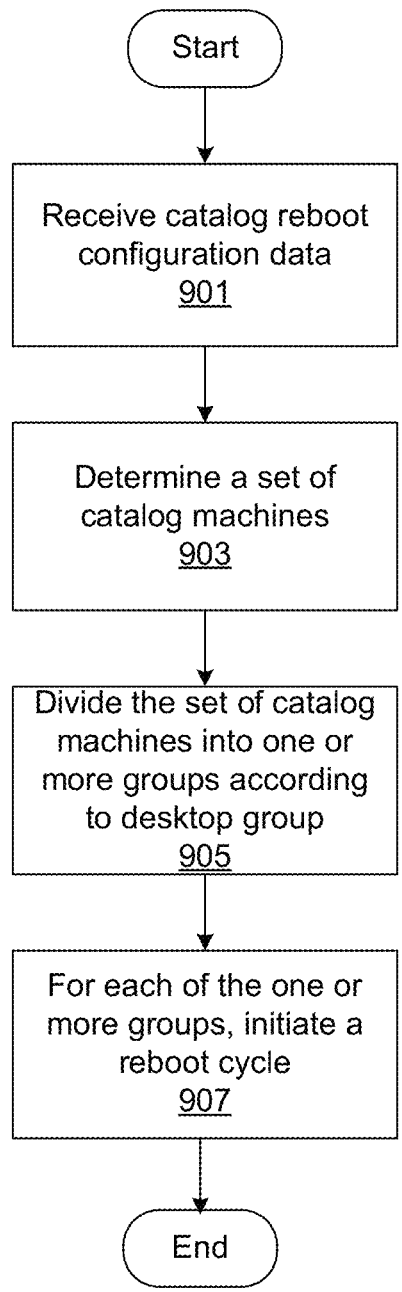
FIG. 9 illustrates an example method for performing a catalog reboot according to one or more aspects of the disclosure.

FIG. 9 illustrates an example method for performing a catalog reboot.

At step 901, a computing device may receive catalog reboot configuration data. As discussed above, a catalog reboot may be started on-demand, such as via SDK calls and/or via a user interface (UI). Various options may be specified, such as a catalog identifier that is to be rebooted, an image that the machines should be updated to, and the like, when the SDK calls are made or when a user inputs the options into the UI.

At step 903, the computing device may determine a set of catalog machines. This may include identifying all the machines that are members of the catalog that is to be rebooted and adding those member machines to the set of catalog machines. In some variations, the set of catalog machines is started in response to receipt of the catalog reboot configuration data and is not changed thereafter. Accordingly, if any machine is added to the catalog after the set of catalog machines has been determined, it may not be rebooted by the catalog reboot.

At step 905, the computing device may divide the set of catalog machines into one or more groups according to the desktop group that each machine is a member of. For example, if the set of catalog machines includes machines assigned to two desktop groups, the machines may be divided into a first group that has the member machines of the first desktop group and a second group that has the member machines of the second desktop group.

In some embodiments, if the catalog reboot is for a PvD update, the one or more groups may be divided as follows. Each group may include machines that are not in the power state "off" and are also members of the same desktop group. For example, a set of catalog machines may include 4 machines, such as machine A (power state "off" and member of desktop group 1), machine B (power state "on" and member of desktop group 2), machine C (power state "on" and member of desktop group 2) and machine D (power state "on" and member of desktop group 1). Such a set of catalog machines may be divided into two groups with one of the groups including machine D and the other group including machines B and C. Machine A may be excluded from the two groups because it is in the power state "off."

At step 907, the computing device may, for each of the one or more groups, initiate a reboot cycle. Thus, if the dividing of step 905 results in two groups, two reboot cycles may be created. In some variations, this may include adding an entry to the reboot cycle table for each reboot cycle and initializing various parameters of each created entry in accordance with the parameters of the respective group. For example, the entry for the reboot cycle may be configured with the duration, grace period, etc., as specified by the catalog reboot configuration data. Other parameters of the entry for the reboot cycle may be initialized based on system data, such as by determining the reboot cycle identifier, or data of the machines that are members of the respective group.

Resulting from the initialization of each reboot cycle, a reboot cycle management service may begin processing each reboot cycle (e.g., via a method similar to FIG. 7). Each of the reboot cycles may execute concurrently. The duration for each cycle is that specified for the overall catalog reboot (e.g., as specified in the catalog reboot configuration data). Because the number of machines in each group may differ in some instances, the interval between machine reboots in each reboot cycle may also differ.

As discussed throughout this disclosure, an SDK may be used when creating reboot schedules and catalog reboots. The SDK may support various scripts or "cmdlets" that assist in creating the reboot schedules and catalog requests, accessing information during the reboots, pausing and/or stopping a reboot schedule and catalog request. Each cmdlet may support various parameters that are used by the cmdlet when performing its functions. Some of these parameters may be mandatory and some may be optional. If an optional parameter is not supplied when a cmdlet is called, a default value may be used. Additionally, a cmdlet may return data once complete, such as an SDK object or other data. For example, the SDK may include a cmdlet for creating a new broker reboot schedule (e.g., named "new-brokerrebootschedule"); a cmdlet for setting a reboot schedule that was previously created (e.g., named "set-brokerrebootschedule"); a cmdlet for removing a reboot schedule that was previously created (e.g., named "remove-brokerrebootschedule"); a cmdlet for getting a reboot schedule that was previously created (e.g., named "get-brokerrebootschedule"); a cmdlet for starting a catalog reboot (e.g., named "start-brokerrebootcycle"); a cmdlet for stopping a reboot cycle (e.g., named "stop-brokerrebootcycle"); a cmdlet for getting a reboot cycle (e.g., named "get-brokerrebootcycle"); and the like.

Figure 12:
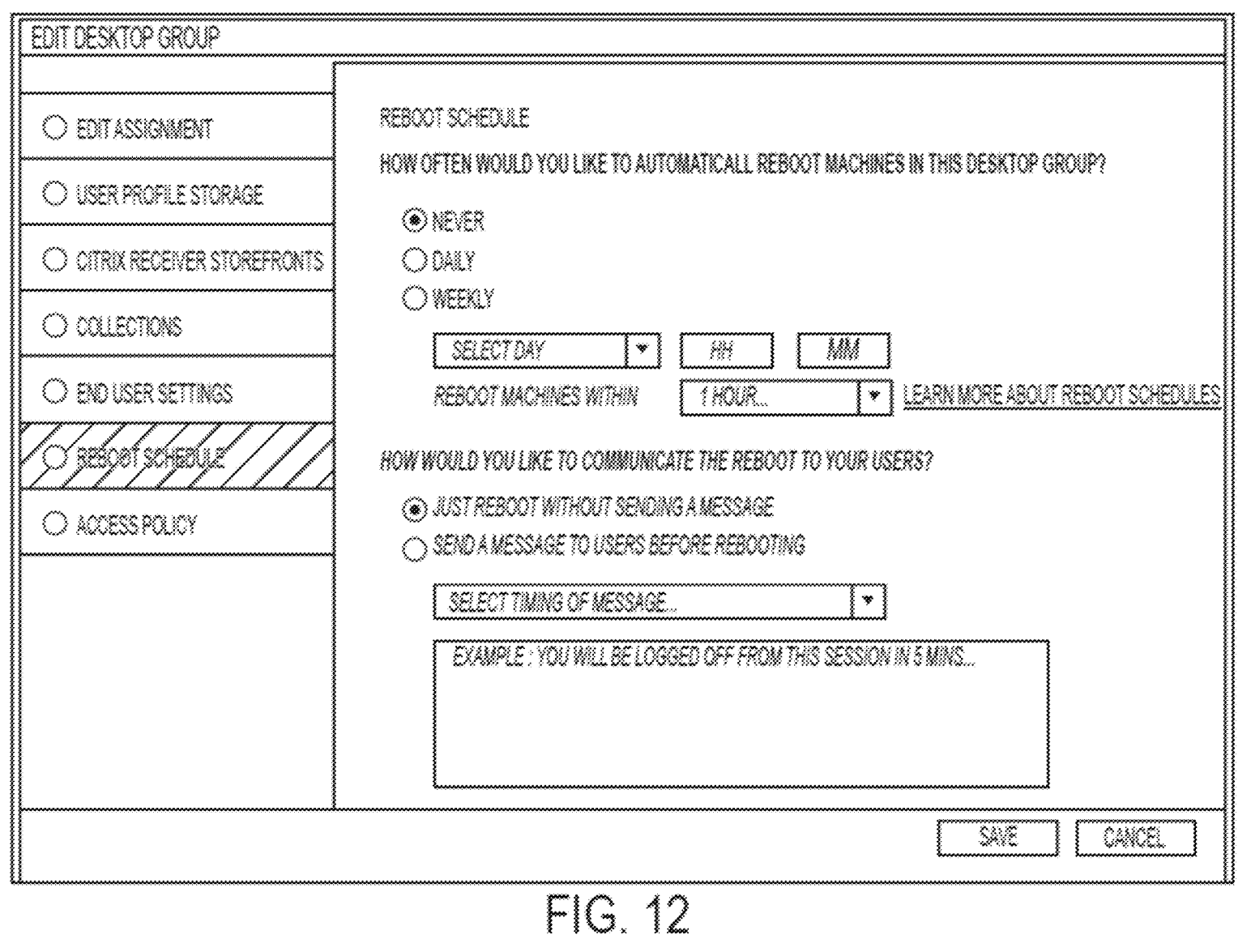

Additionally, a user interface may be used as an interface between the SDK and the user so that the administrator or user can be guided why they create a reboot schedule or catalog reboot. FIG. 12 illustrates an example screenshot from a user interface that can be used to guide a user as he or she creates a reboot schedule or catalog reboot.

Although the subject matter has been described in language specific to structural features and/or methodological acts, it is to be understood that the subject matter defined any claim is not necessarily limited to the specific features or acts described above. Rather, the specific features and acts described above are described as some example implementations of the following claims.

We claim:

1. A method, comprising:
    initiating, by a computing device, a first reboot cycle for performing automated machine reboots;
    determining a set of eligible machines for the first reboot cycle;
    determining an interval between each machine reboot in the first reboot cycle;
    based on the interval, performing machine-specific processing for the first reboot cycle wherein an attempt is made to reboot each machine in the set of eligible machines; and
    initiating a second reboot cycle that is for performing additional automated machine reboots and that runs concurrently with the first reboot cycle.

2. The method of claim 1, further comprising:
    determining a reboot cycle state;
    proceeding to process the first reboot cycle based on the reboot cycle state;
    initializing and storing data for each machine in the set of eligible machines; and
    updating the reboot cycle state for the first reboot cycle.

3. The method of claim 1, further comprising:
    processing a configured reboot schedule that includes a desktop group that is to be rebooted; and
    wherein the initiating of the first reboot cycle is performed based on determining to initiate the first reboot cycle in accordance with the configured reboot schedule.

4. The method of claim 1, further comprising:
    receiving catalog reboot configuration data;
    determining a set of catalog machines;

dividing the set of catalog machines into two or more groups according to desktop group; and for each of the two or more groups, initiating a corresponding reboot cycle, resulting in a plurality of reboot cycles being initiated, wherein the first reboot cycle and the second reboot cycle are of the plurality of reboot cycles.

5. The method of claim 4, wherein the plurality of reboot cycles includes a third reboot cycle, and wherein each of the plurality of reboot cycles run concurrently with each other.

6. The method of claim 1, wherein performing the machine-specific processing for the first reboot cycle includes performing an image update for each machine in the set of eligible machines.

7. The method of claim 1, wherein the set of eligible machines includes a shared virtual desktop infrastructure (VDI) machine, a shared remote desktop services (RDS) machine, a private VDI machines, or a physical machine.

8. The method of claim 1, wherein performing the machine-specific processing for the first reboot cycle includes attempting to reboot machines in the set of eligible machines in at least a first phase and a second phase;

wherein, during the first phase, a subset of machines from the set of eligible machines is in a reboot maintenance mode and one or more remaining machines from the set of eligible machines are available for sessions; and wherein the reboot maintenance mode disables brokering of new sessions but allows reconnecting to existing sessions.

9. An apparatus, comprising:
one or more processors; and
memory storing executable instructions configured to, when executed by the one or more processors, cause the apparatus to:
  initiate a first reboot cycle for performing automated machine reboots,
  determine a set of eligible machines for the first reboot cycle,
  determine an interval between each machine reboot in the first reboot cycle,
  based on the interval, perform machine-specific processing for the first reboot cycle wherein an attempt is made to reboot each machine in the set of eligible machines, and
  initiate a second reboot cycle that is for performing additional automated machine reboots and that runs concurrently with the first reboot cycle.

10. The apparatus of claim 9, wherein the executable instructions are further configured to, when executed by the one or more processors, cause the apparatus to:
  process a configured reboot schedule that includes a desktop group that is to be rebooted; and
  proceed with initiating the first reboot cycle based on determining to initiate the first reboot cycle in accordance with the configured reboot schedule.

11. The apparatus of claim 9, wherein the executable instructions are further configured to, when executed by the one or more processors, cause the apparatus to:
  receive catalog reboot configuration data;
  determine a set of catalog machines;
  divide the set of catalog machines into two or more groups according to desktop group; and
  for each of the two or more groups, initiate a corresponding reboot cycle, resulting in a plurality of reboot cycles being initiated, wherein the first reboot cycle and the second reboot cycle are of the plurality of reboot cycles.

12. The apparatus of claim 9, wherein performing the machine-specific processing for the first reboot cycle includes attempting to reboot machines in the set of eligible machines in at least a first phase and a second phase;

wherein, during the first phase, a subset of machines from the set of eligible machines is in a reboot maintenance mode and one or more remaining machines from the set of eligible machines are available for sessions; and wherein the reboot maintenance mode disables brokering of new sessions but allows reconnecting to existing sessions.

13. A method, comprising:
initiating, by a computing device, a first reboot cycle for performing automated machine reboots;
determining a first set of eligible machines for the first reboot cycle;
determining a first interval between each machine reboot in the first reboot cycle;
based on the first interval, performing first machine-specific processing for the first reboot cycle wherein an attempt is made to reboot each machine in the first set of eligible machines;
initiating a second reboot cycle that is for performing additional automated machine reboots and that runs concurrently with the first reboot cycle;
determining a second set of eligible machines for the second reboot cycle;
determining a second interval between each machine reboot in the second reboot cycle; and
based on the second interval, performing second machine-specific processing for the second reboot cycle wherein an attempt is made to reboot each machine in the second set of eligible machines.

14. The method of claim 13, further comprising:
determining a reboot cycle state;
proceeding to process the first reboot cycle based on the reboot cycle state;
initializing and storing data for each machine in the first set of eligible machines; and
updating the reboot cycle state for the first reboot cycle.

15. The method of claim 13, further comprising:
processing a configured reboot schedule that includes a desktop group that is to be rebooted;
wherein the initiating of the first reboot cycle is performed based on determining to initiate the first reboot cycle in accordance with the configured reboot schedule; and
wherein the initiating of the second reboot cycle is performed based on determining to initiate the second reboot cycle in accordance with the configured reboot schedule.

16. The method of claim 13, further comprising:
receiving catalog reboot configuration data;
determining a set of catalog machines;
dividing the set of catalog machines into two or more groups according to desktop group; and
for each of the two or more groups, initiating a corresponding reboot cycle, resulting in a plurality of reboot cycles being initiated, wherein the first reboot cycle and the second reboot cycle are of the plurality of reboot cycles.

17. The method of claim 16, wherein the plurality of reboot cycles includes a third reboot cycle, and wherein each of the plurality of reboot cycles run concurrently with each other.

18. The method of claim 13, wherein performing the first machine-specific processing for the first reboot cycle includes performing an image update for each machine in the set of eligible machines.

19. The method of claim 13, wherein the first set of eligible machines includes a shared virtual desktop infrastructure (VDI) machine, a shared remote desktop services (RDS) machine, a private VDI machines, or a physical machine.

20. The method of claim 13, wherein performing the first machine-specific processing for the first reboot cycle includes attempting to reboot machines in the first set of eligible machines in at least a first phase and a second phase;
- wherein, during the first phase, a subset of machines from the first set of eligible machines is in a reboot maintenance mode and one or more remaining machines from the first set of eligible machines are available for sessions; and
- wherein the reboot maintenance mode disables brokering of new sessions but allows reconnecting to existing sessions.

\* \* \* \* \*